United States Patent [19]

Dola et al.

[11] Patent Number: 5,024,614
[45] Date of Patent: Jun. 18, 1991

[54] SURFACE ACCESSIBLE WIRING SYSTEM AND ASSEMBLY

[75] Inventors: Frank P. Dola; Steven Feldman; John H. Lauterbach, all of Hudson; William G. Mengelson, Clearwater, all of Fla.

[73] Assignee: AMP Incorporated, Harrisburg, Pa.

[21] Appl. No.: 352,792

[22] Filed: May 16, 1989

Related U.S. Application Data

[63] Continuation-in-part of Ser. No. 249,539, Sep. 26, 1988, abandoned.

[51] Int. Cl.$^5$ .............................. H01R 25/16
[52] U.S. Cl. ..................... 439/114; 52/287; 174/48
[58] Field of Search ............ 52/242, 287; 174/48, 174/101; 439/113, 114, 215

[56] References Cited

U.S. PATENT DOCUMENTS

| | | | |
|---|---|---|---|
| 2,156,633 | 5/1939 | La Ducer | 174/48 |
| 3,195,698 | 7/1965 | Codrea | 189/34 |
| 3,404,706 | 10/1968 | D'Esopo | 174/101 |
| 3,721,762 | 3/1973 | Gooding | 174/48 |
| 4,166,195 | 8/1979 | Schwab | 174/101 |
| 4,360,705 | 11/1982 | Rogers | 174/48 |
| 4,443,654 | 4/1984 | Klachbarth et al. | 174/48 |
| 4,589,449 | 5/1986 | Bramwell | 174/101 |
| 4,627,679 | 12/1986 | de Villemeur et al. | 439/113 |

FOREIGN PATENT DOCUMENTS

| | | | |
|---|---|---|---|
| 2575002 | 6/1986 | France | 174/101 |
| 2132421 | 7/1984 | United Kingdom | 174/101 |

OTHER PUBLICATIONS

Hubbell brochure entitled Polytrak TM Surface Non-Metallic Raceways.
AT Power Systems brochure.
HKL Wireduct & Raceway catalog.
Iso-duct brochure entitled Commercial, Industrial, Institutional Raceway Distribution Systems.
American Electric, FL Industries, Inc. brochure.
IBOCO brochure entitled Raceway-System.
Panduit brochure entitled Surface Raceway System.
Panduit brochure entitled Mod-Power, U.L. Listed Surface System.
Walker brochure entitled Walkermold TM.

*Primary Examiner*—Gary F. Paumen
*Attorney, Agent, or Firm*—Robert W. Pitts

[57] ABSTRACT

A surface accessible wiring system for the distribution of power and signal conductors such as telephone or data conductors is disclosed. A raceway comprises a channel member having a plurality of compartments, a cover which can be securely snapped to the raceway channel and a plurality of connector housings. Each raceway component is extruded from a material such as aluminum. Ribs on the cover and the connector housings are securely snapped into engagement with lips on the channels so that the covers can only be removed with the use of a tool. The channels are shallow so that the raceway assembly can be mounted substantially flush with the exterior surface of a wall or a wall panel, either at the base or top of the wall or at desk level.

33 Claims, 16 Drawing Sheets

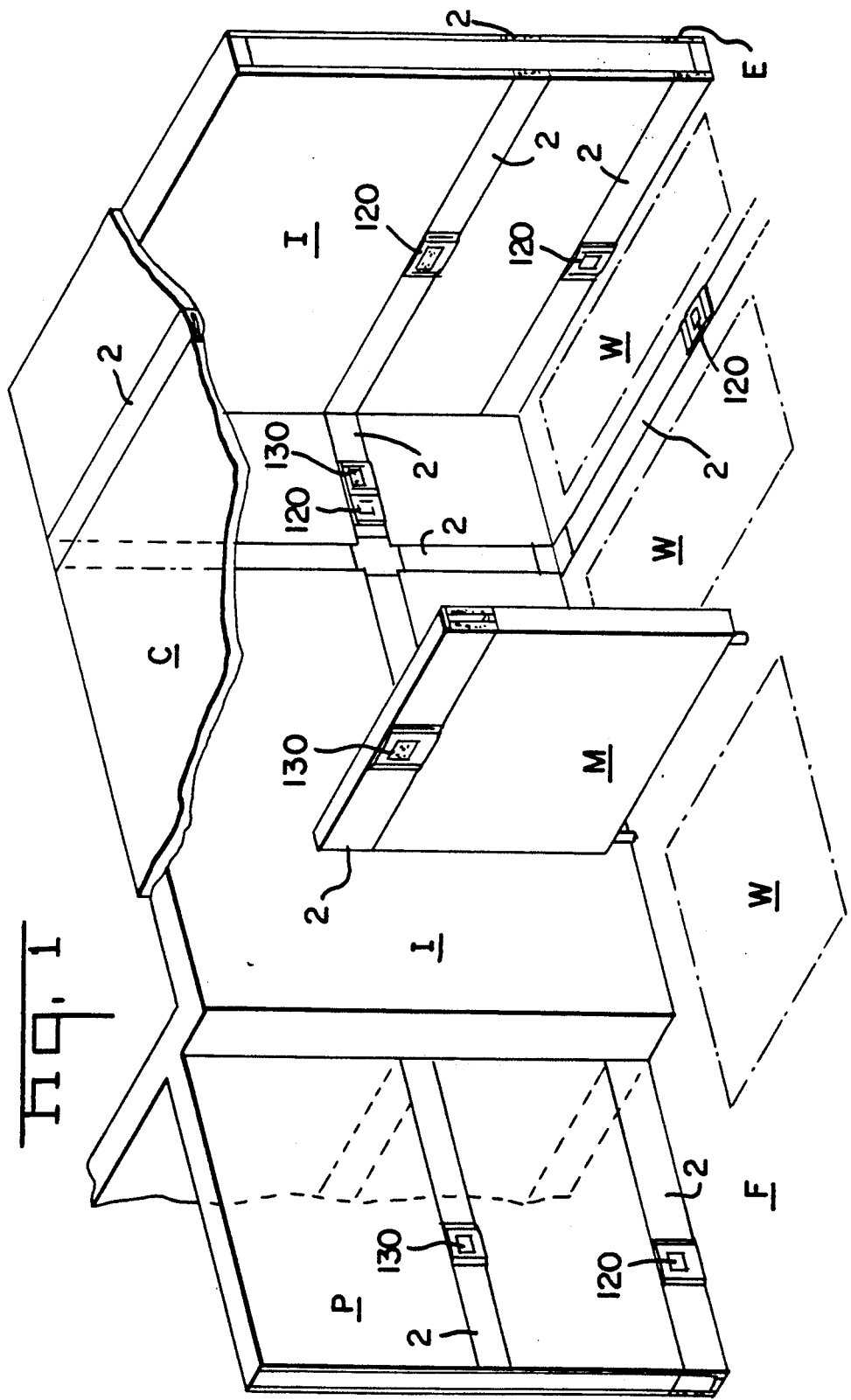

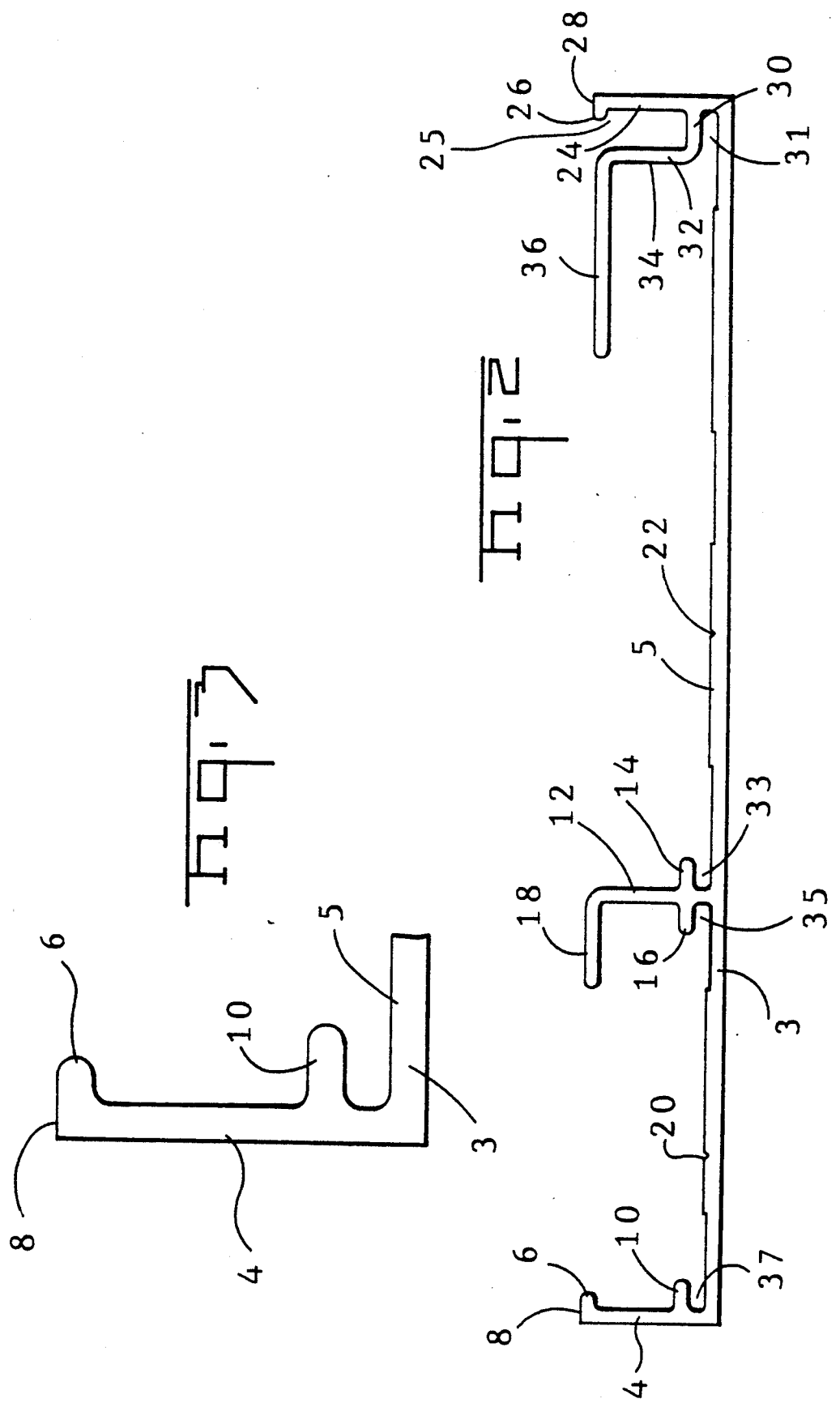

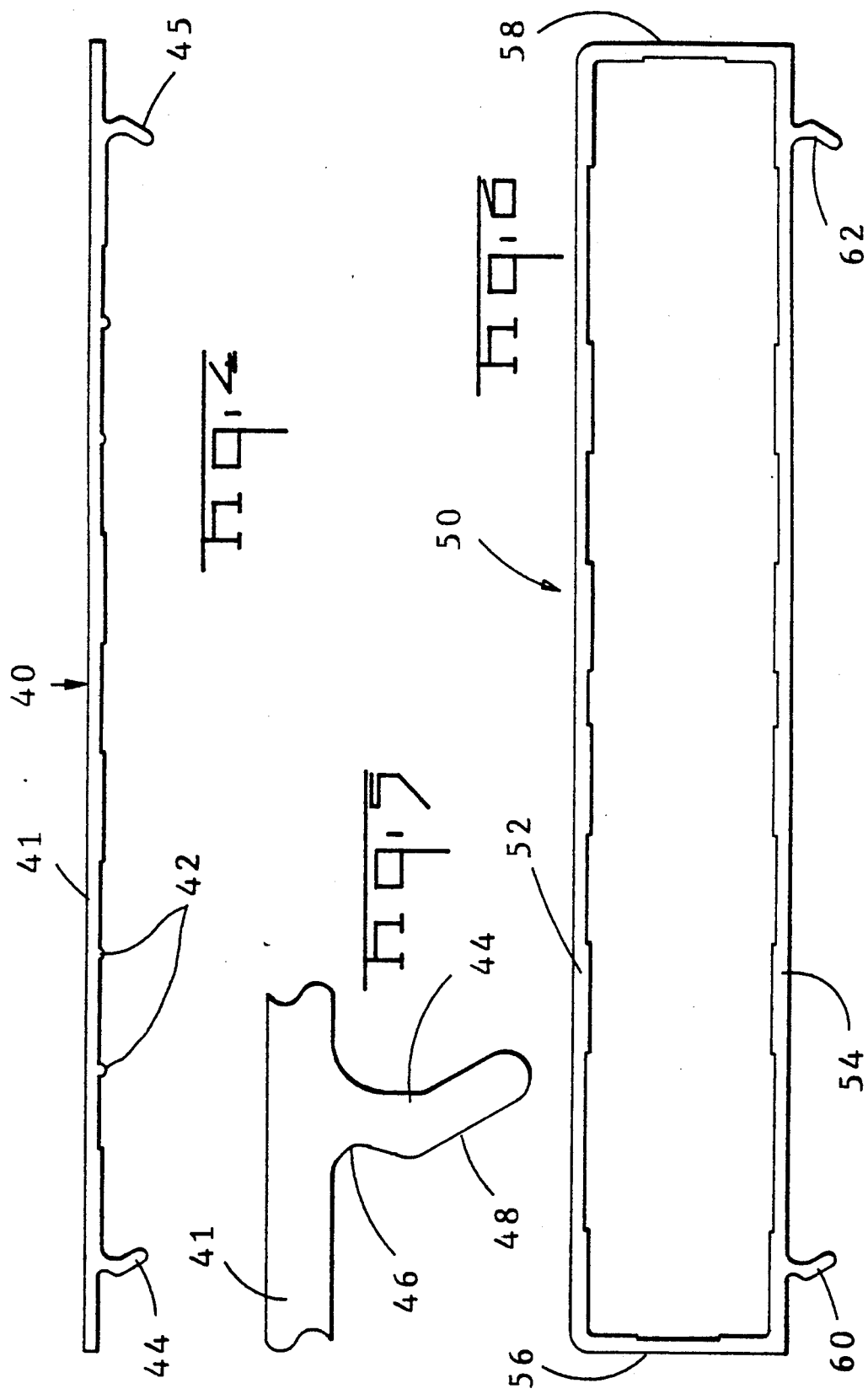

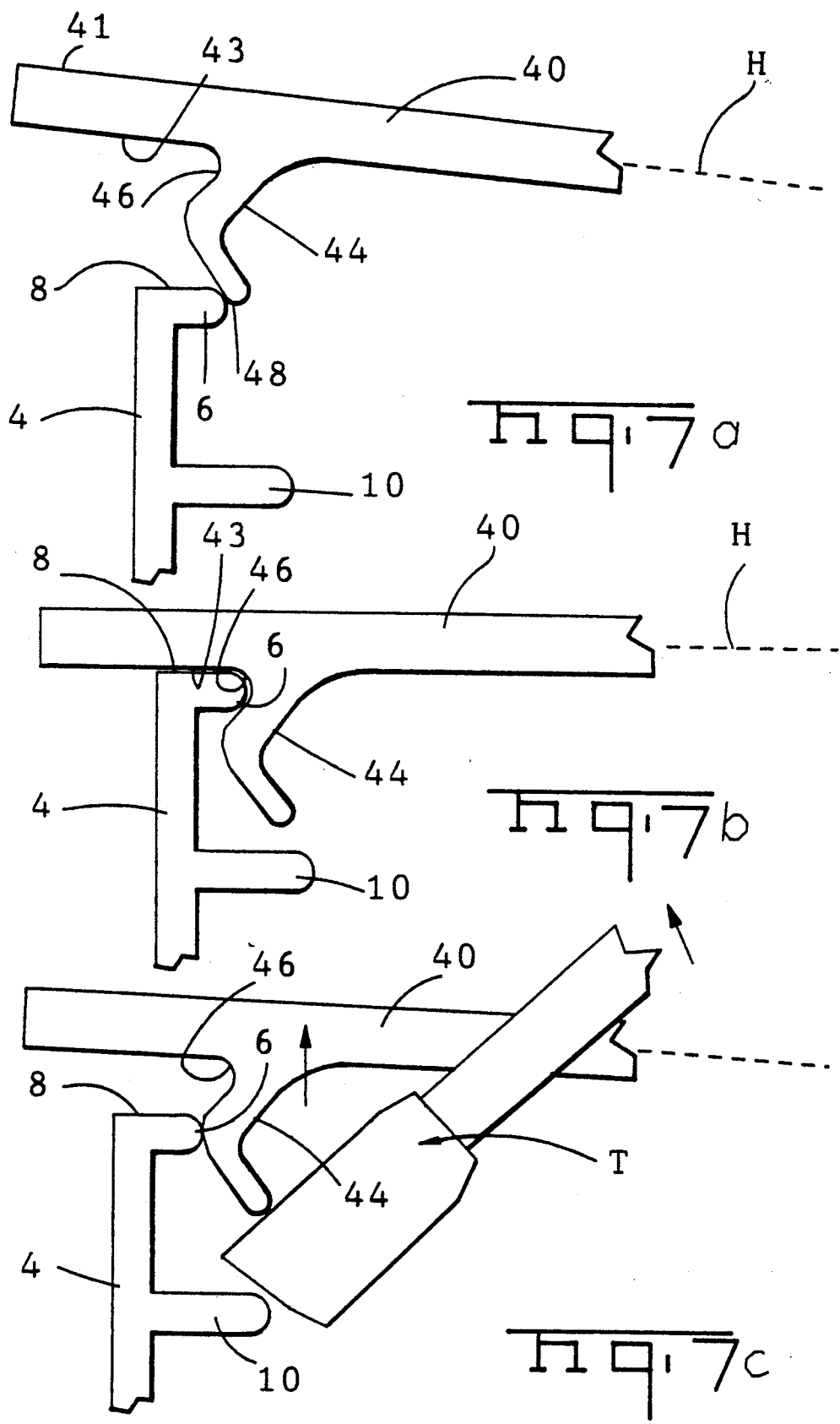

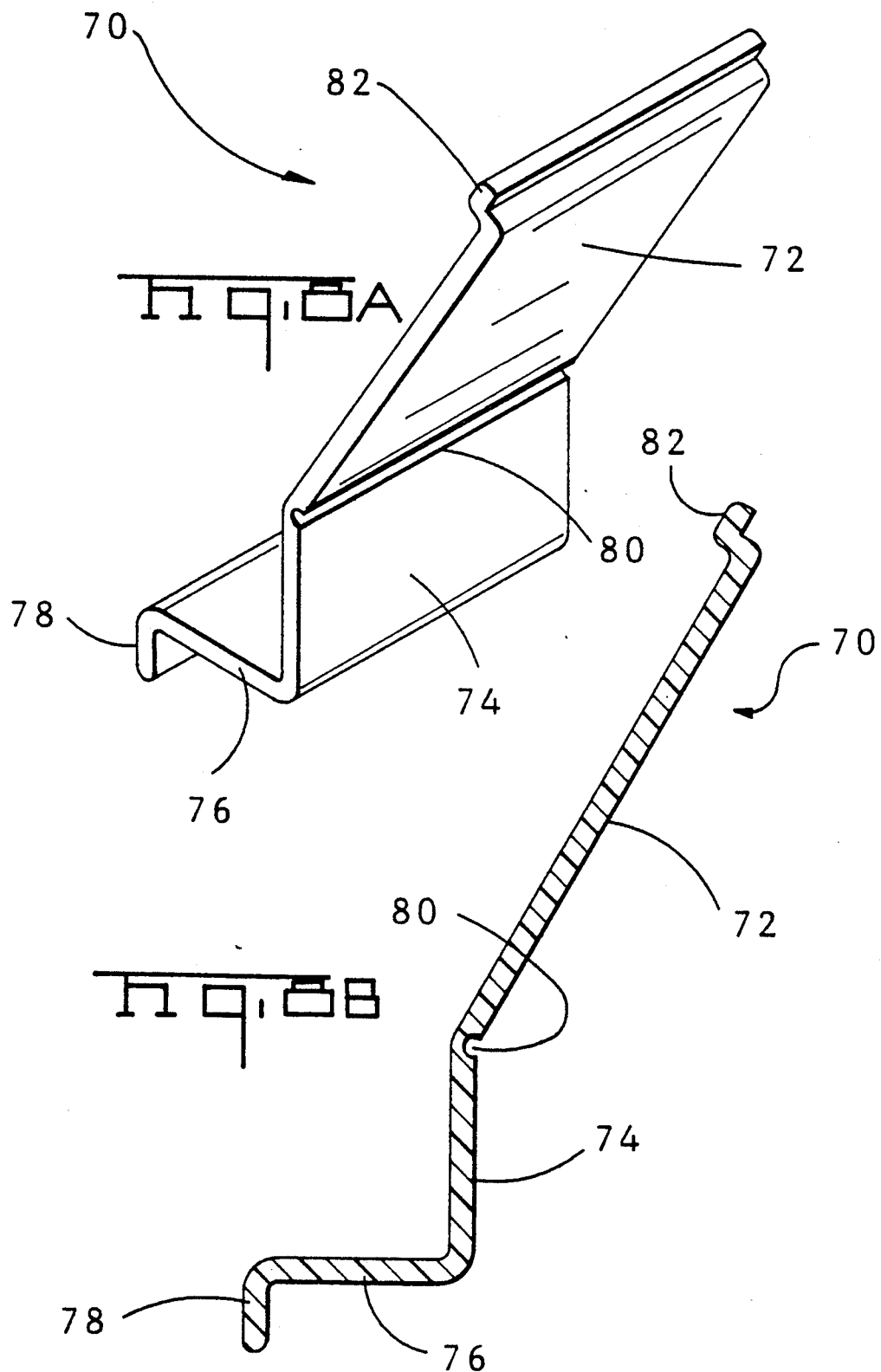

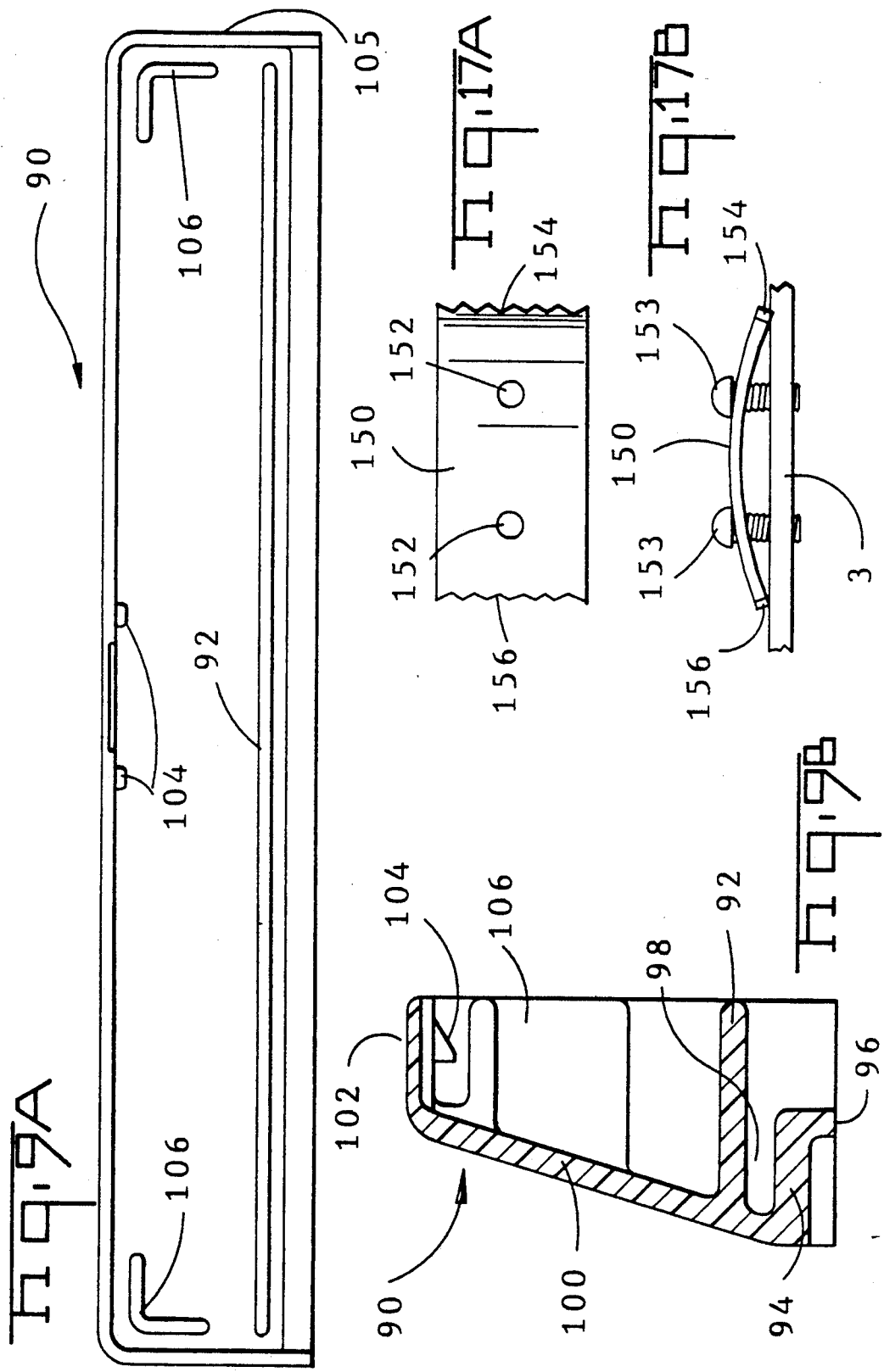

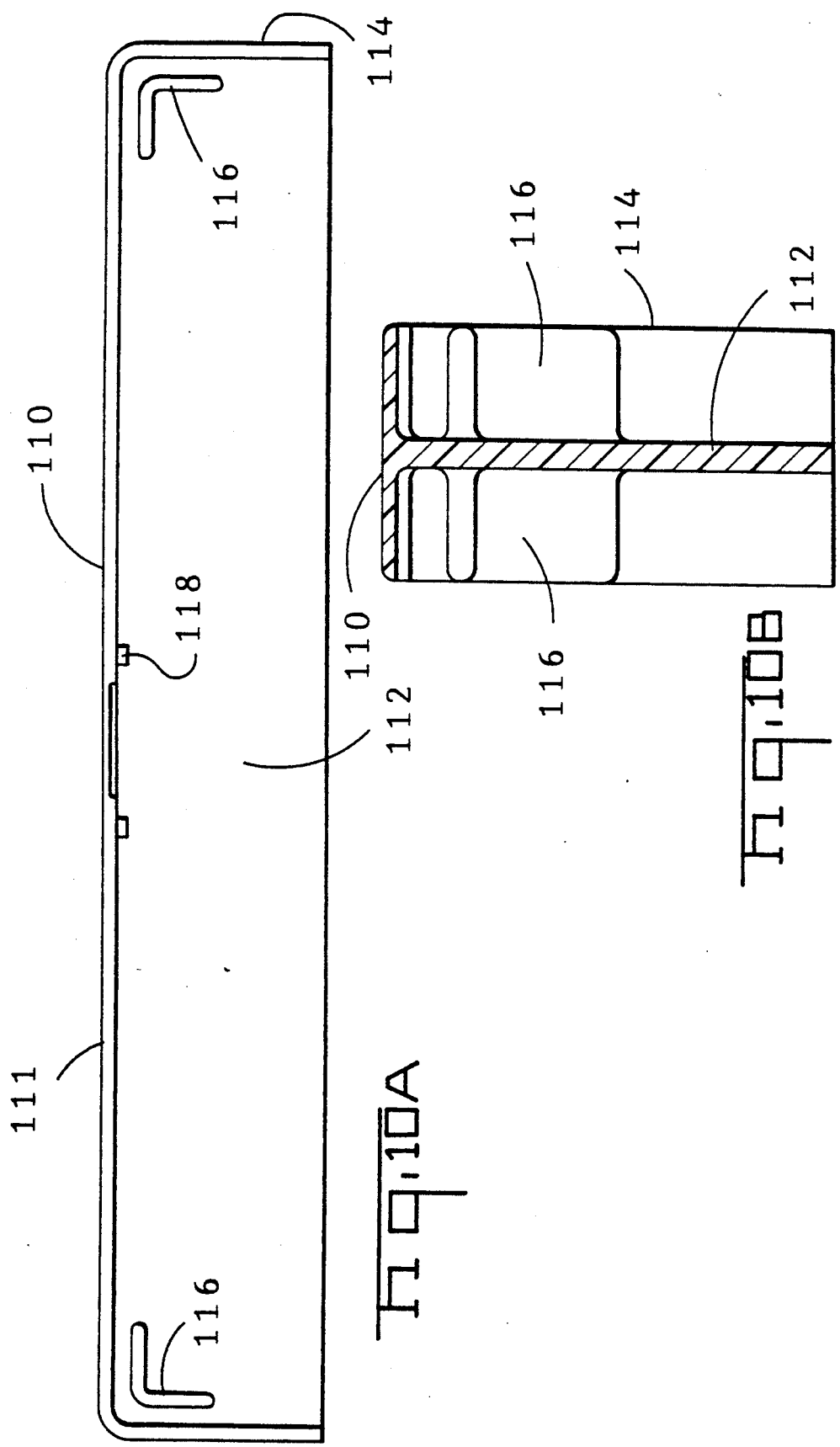

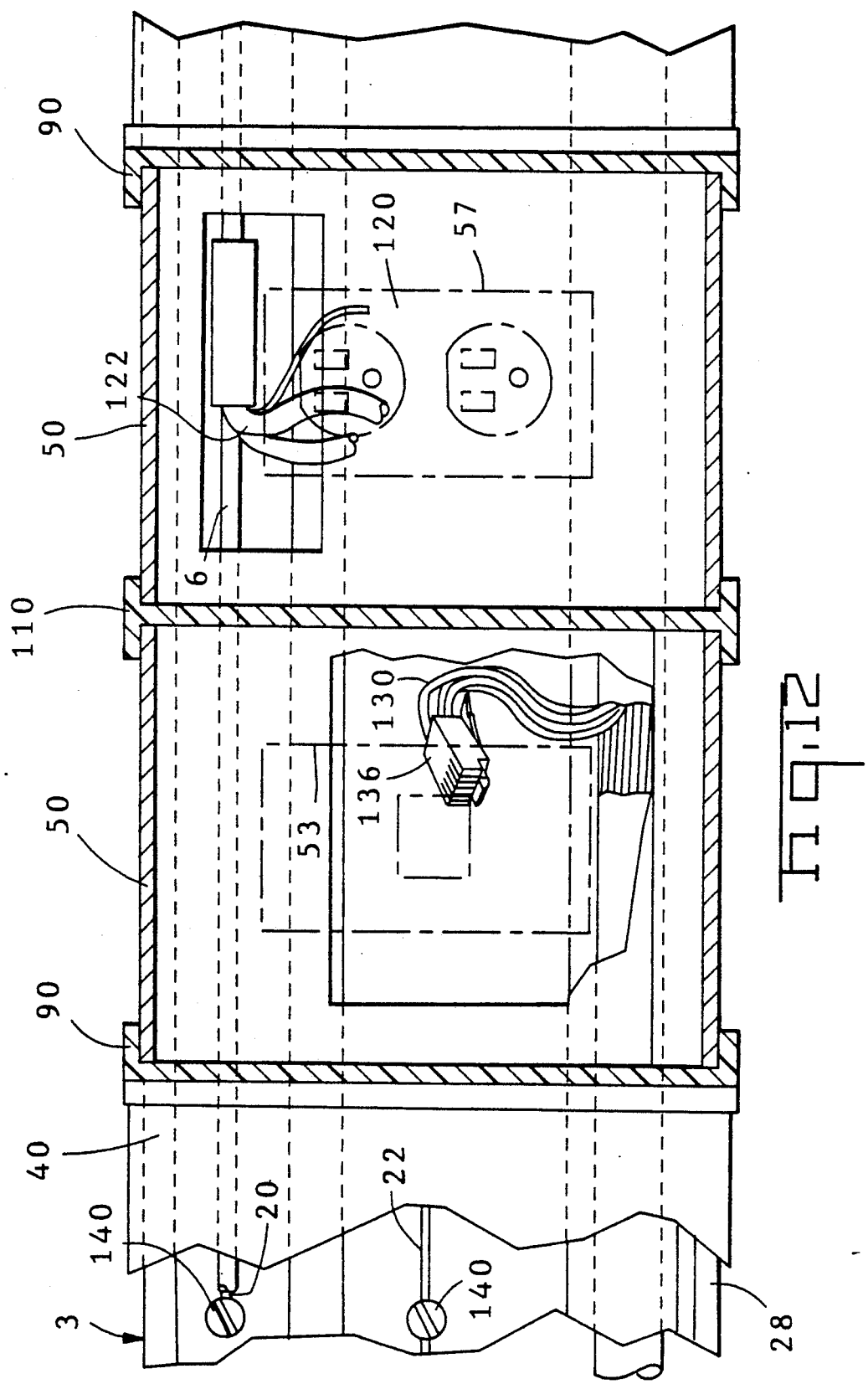

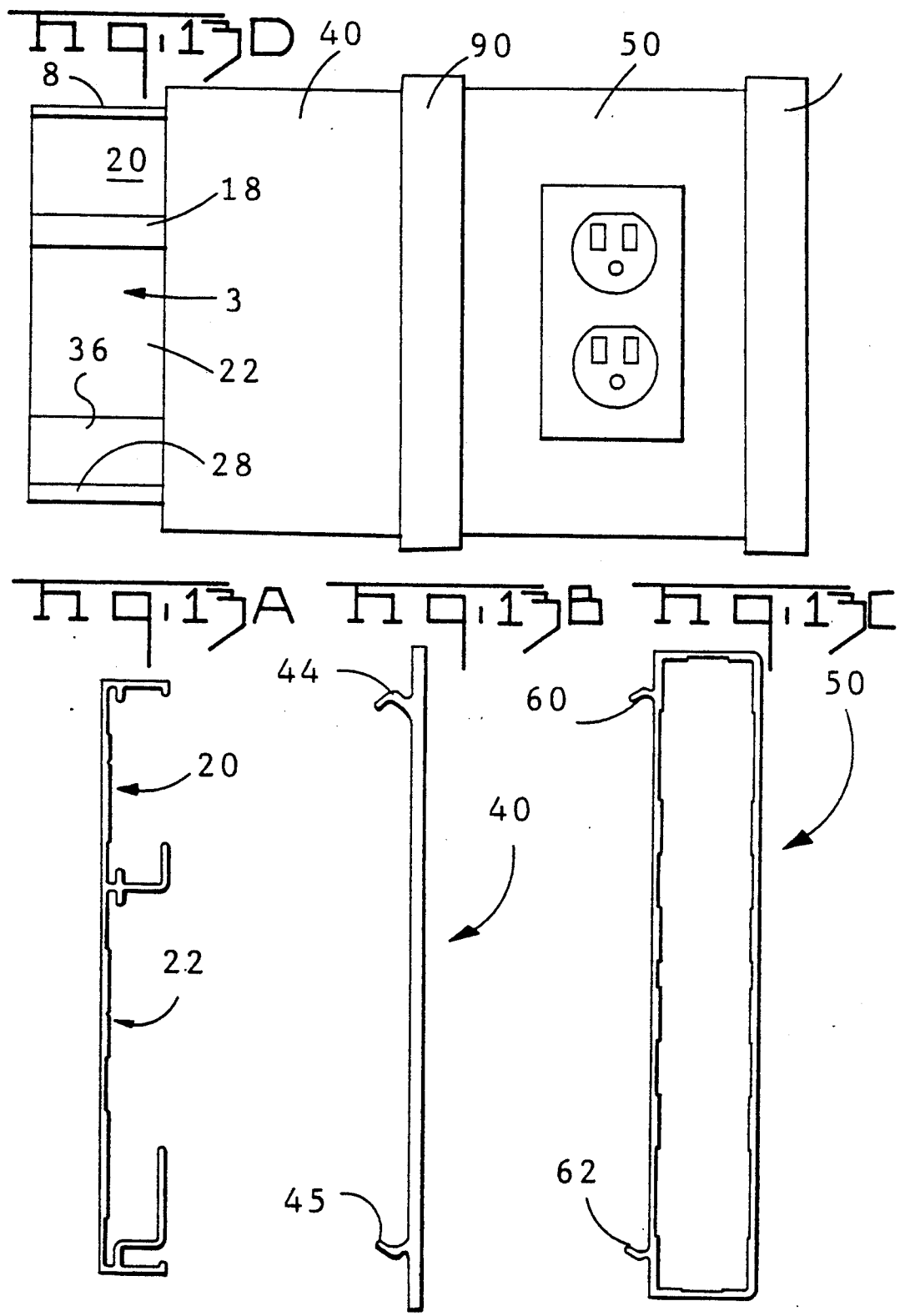

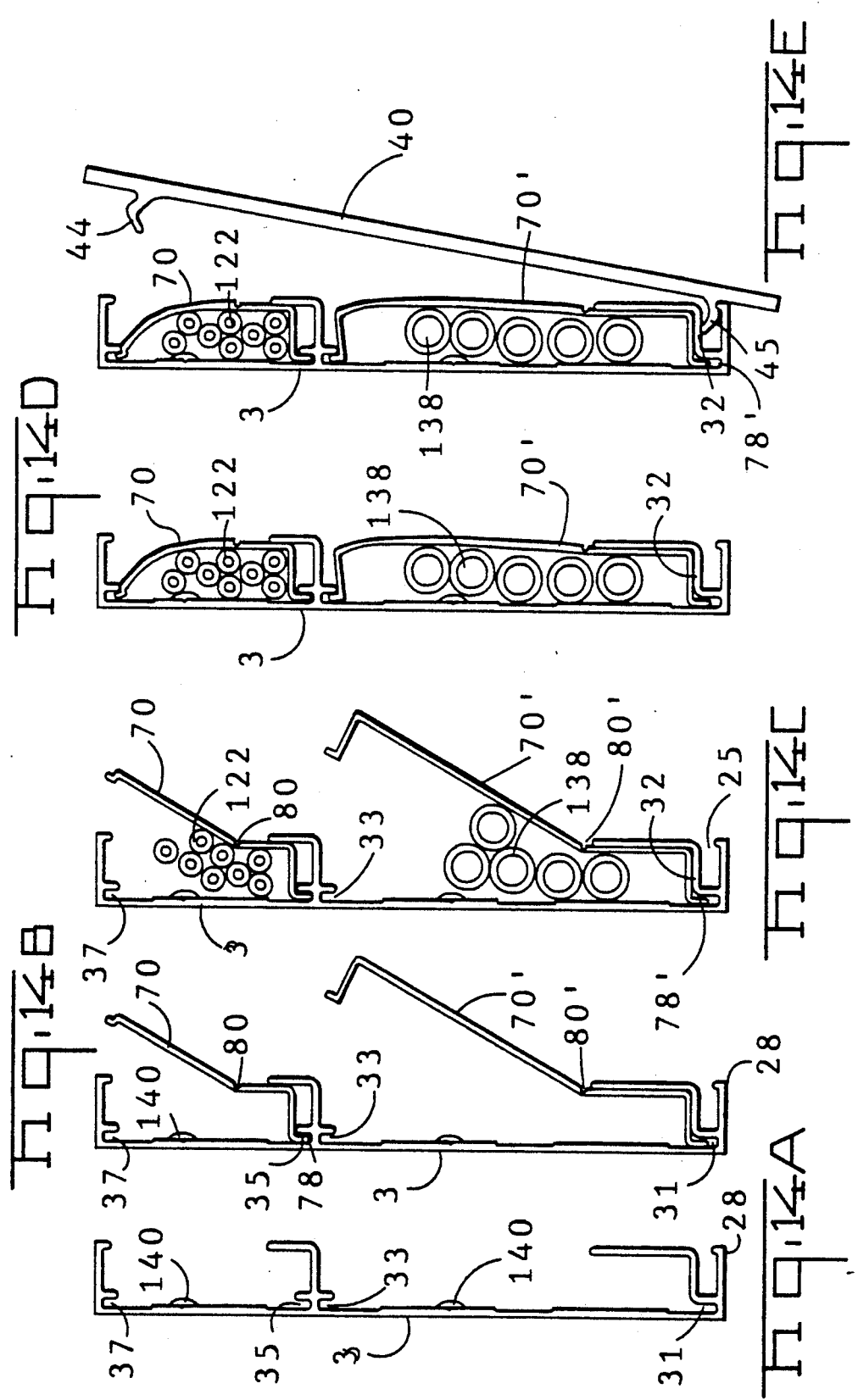

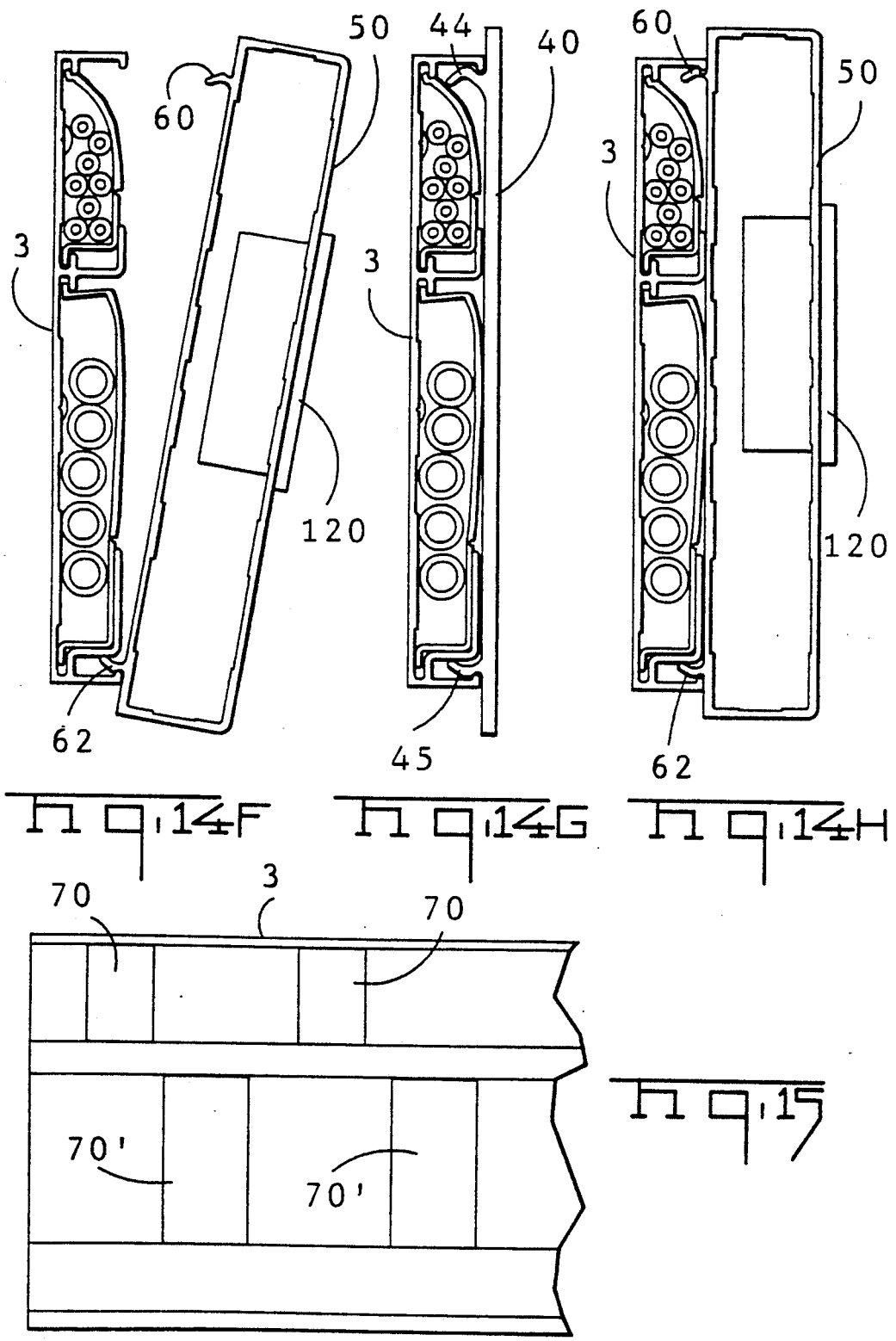

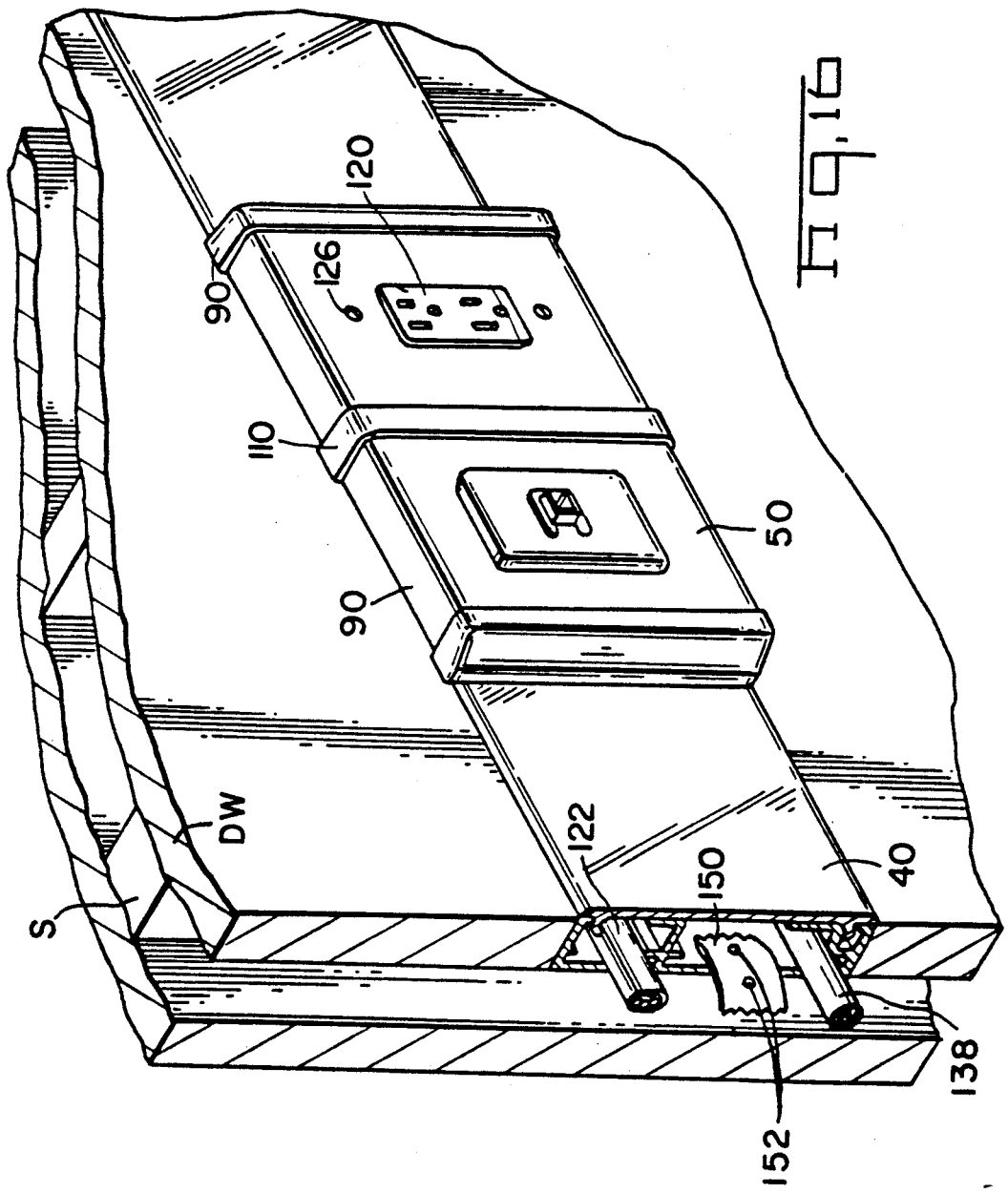

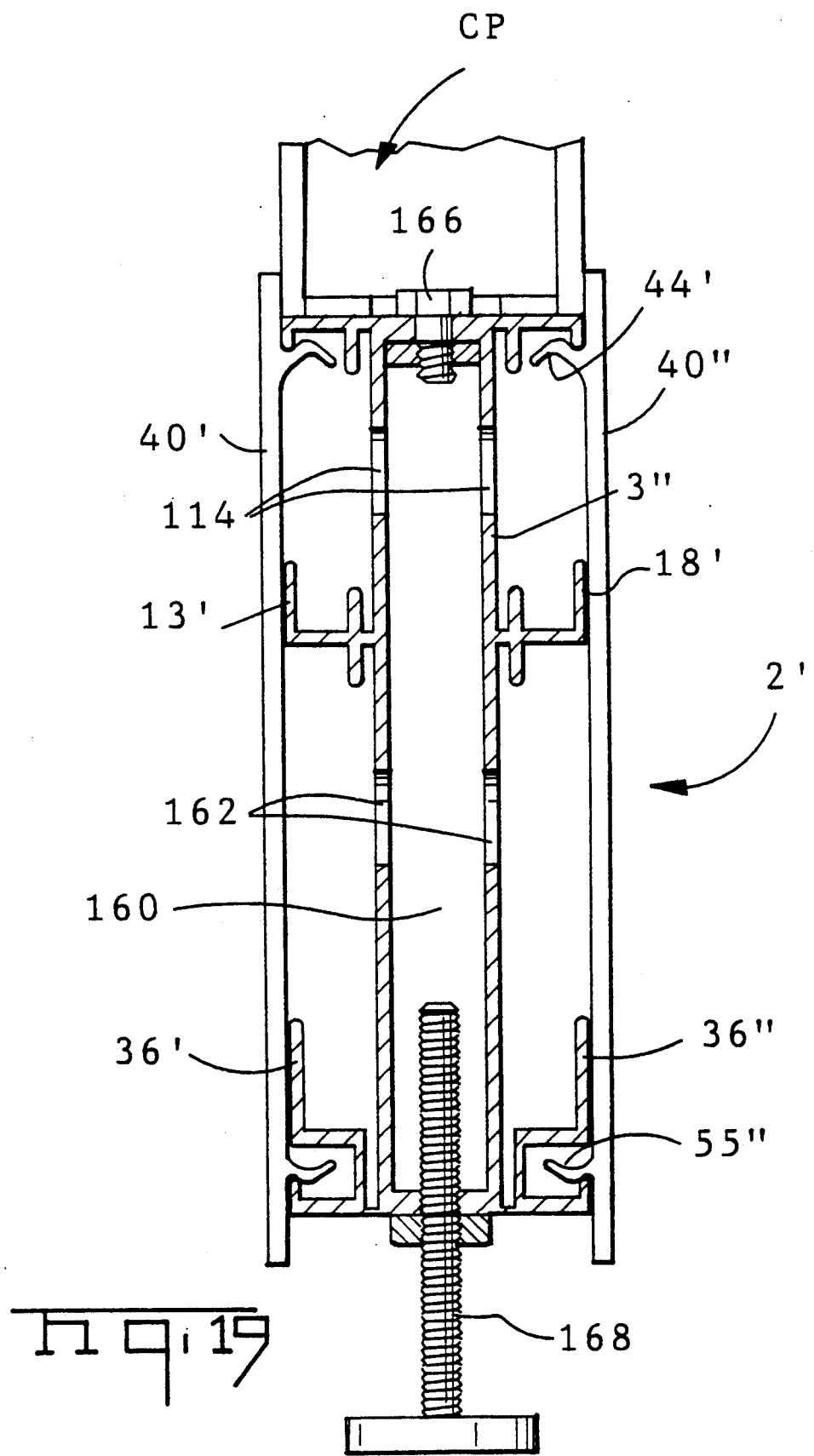

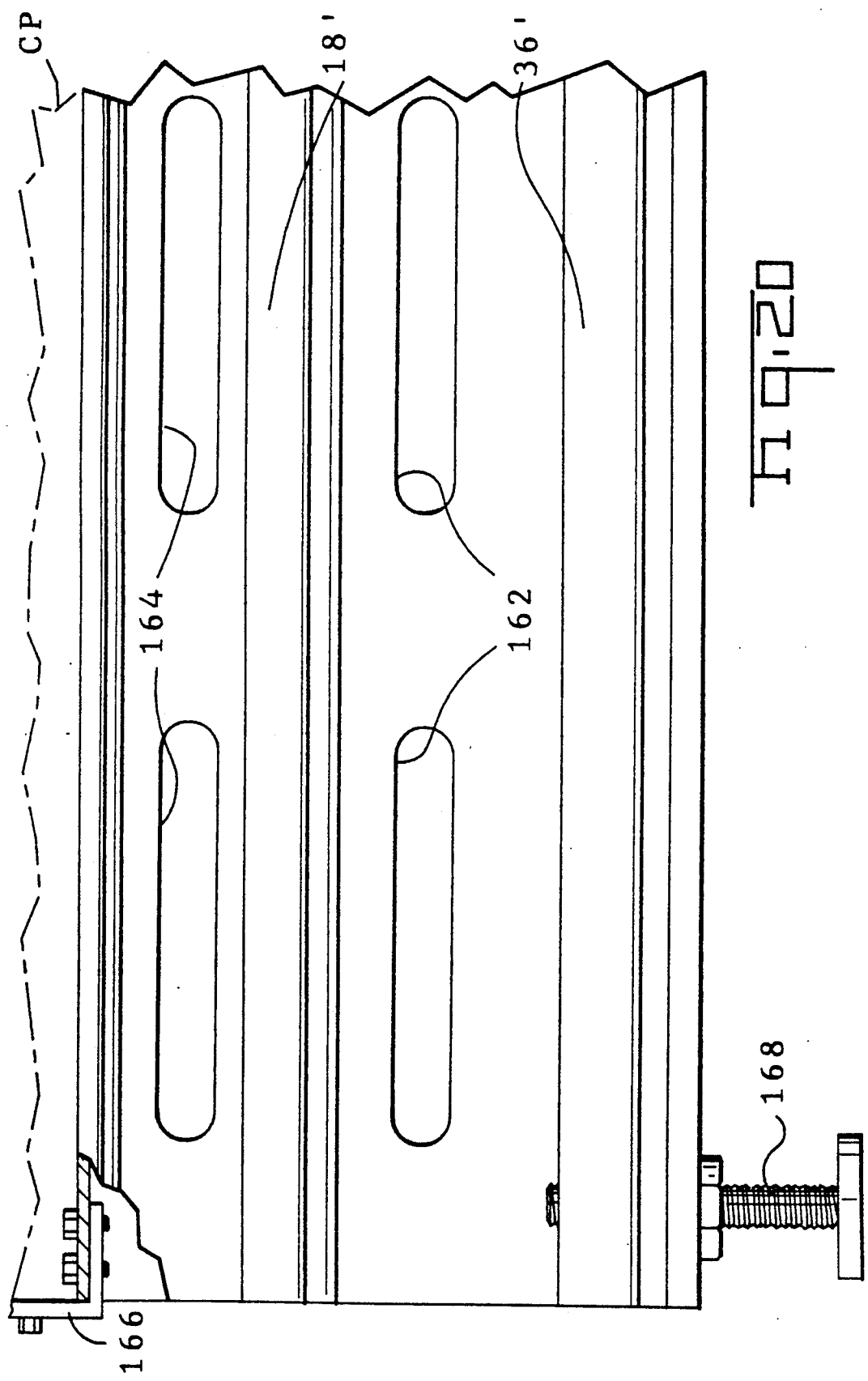

SURFACE ACCESSIBLE WIRING SYSTEM AND ASSEMBLY

CROSS REFERENCE TO PENDING APPLICATION

This application is a continuation-in-part of U.S. application Ser. No. 249,539, filed Sept. 26, 1988 now abandoned.

FIELD OF THE INVENTION

This invention relates to a raceway system and assembly employed with power and signal conductors such as telephone or data conductors which can be mounted either inlaid or along the surface of exterior or interior walls or inlaid in ceiling, floor, or cellular interior panels. More particularly, this invention relates to a raceway system and assembly, including outlets for power and signal conductors that permit an efficient installation and compliance with safety requirements while at the same time permitting a ready changeover through raceway compartments dividing power from signal conductors through a unique pathway provided between raceway and outlets.

BACKGROUND OF THE INVENTION

Surface raceway systems have evolved from a practice of installing channels or ducts upon the walls of existing structures into which power conductors are laid or drawn and onto which power outlets are attached to provide a distributed electrical power system for buildings.

One such system is disclosed in U.S. Pat. No. 3,404,706 which has a rectangular shaped channel form based upon having side walls with reversibly bent in-turned ends to engage a cover. Corner, or end, fittings are secured to the raceway by separate couplings which are screwed both to the raceway and the fittings. Mounting plates for receptacles, switches, and other wiring devices are clamped to the base between covers to prevent removal by an outward force. A cover section joint shielding member for providing complete shielding against outside interference has a shield plate having a greater width than the supporting strap to which it is attached to provide complete shielding when the shield plate is snapped in place to a raceway base between adjacent cover sections.

With the advent of a need to provide a distributed signal electrical system as well as a power system, raceways have been developed such as that found in U.S. Pat. No. 4,360,705 having two isolated wiring compartments in which the different wiring, power or telephone or data, can be channeled to office work stations within a building. This serves to separate relatively high power voltages which can be dangerous from contacting the relatively low voltage conductors utilized for telephone and data distribution. This latter patent also shows the practice of providing a continuity coupling secured by screw fasteners between raceways and fittings.

U.S. Pat. No. 4,017,137 discloses an electrical raceway system having a channel-shaped cover having parallel side walls extending for cooperating in an interlocking engagement with a raceway base and a plurality of receptacles mounted in the cover. Ribs on opposite sides of the receptacle engage arcuate projections on the cover sidewalls to retain the receptacles in assembly with the cover.

Conventional metal raceways normally comprise a steel or aluminum base to which an appropriate metallic cover is snap fitted. U.S. Pat. Nos. 3,721,762 and 4,627,679 illustrate such practice.

Frequently, separate compartments made to extend longitudinally in a given raceway are defined by separate snap-in or snap-fit dividers which can be placed in the base of a raceway and screwed thereto. In usual practice, a cover is provided to extend along the majority of the length of a conventional raceway with some provision made to provide an interface between the wires or conductors in the raceway and external components or outlets. Conventional raceway assemblies include covers with duplex receptacle or other outlet cut-outs such as those for communication or data outlets. Normally the cut-outs for either duplex power receptacles or communication data outlets such as modular telephone jacks are positioned in alignment with the appropriate compartment, either at the top or bottom of the raceway, proximate to the corresponding electrical cable, power or signal. Generally, the cut-outs and outlet cover plates are offset because applicable safety standards require that separate compartments containing different conductors must be physically separated; for example, power conductors must be isolated from signal conductors. Generally, power or signal outlets can be located at convenient points axially along the raceway but must be located at different heights due to access to the different compartments. This requirement is not desirable for a number of reasons, including aesthetics.

Accordingly, it is an object of the present invention to provide a novel, surface-applied raceway system and assembly which, while easier to utilize in terms of installation and alteration, forces a user to employ safe practices in the interconnection of power or signal conductors relative to appropriate outlets. It is a further object of the invention to provide a system and assembly for surface-applied wiring of power and signal conductors and appropriate outlets which facilitate conductor installation and outlet mounting, initially in installation and adapts itself to easy alteration responsive to power and/or signal cable and outlet changes.

Another object of this invention is the provision of a raceway assembly which can be installed so that the exterior is substantially flush with a wall or a wall panel in which the raceway assembly is installed.

It is yet a further object of the invention to provide a snap-together system of raceway cover and outlets which allows the positioning of outlets in a practical and aesthetic manner anywhere along the axial length of the raceway system with easy changeover and modification, while at the same time, precluding accidental displacement of either cover or outlets.

It is yet a further object of the invention to provide a raceway outlet assembly which facilitates the layup and installation of cables or the change thereof in use. It is another object to provide a raceway assembly and system which facilitates inspection of cables, raceway, and outlets, following all interconnections but prior to closure of the assembly.

It is a final object of the invention to provide a raceway assembly and system of components which may be utilized in interior or exterior walls of a building; in ceiling or floors of a building, or in or beneath cellular or modular walls installed within the interior of a building.

SUMMARY OF THE INVENTION

The present invention, in a preferred mode, utilizes a raceway channel of an extruded configuration to define two or more wiring compartments extending axially therealong, each of which is made to include a surface parallel to the base of the channel which cooperates with a cover fitted to such channel to preclude crosswiring; i.e., precludes power wiring from crossover into a signal compartment or signal conductors crossing over to enter into a power compartment. The channel further includes at the top and bottom thereof flat planar surfaces which engage the flat planar surfaces of the cover along the length of the raceway tightly and in a manner to preclude the insertion of standard tools to pry such cover away from such raceway. These outer surfaces are held tightly by the cooperation of radiused lip portions extending from the channel with identically radiused interior surface portions on projections extending from the cover. Power and/or signal compartments or boxes are made to include similar projections with similar radiused surfaces to allow such compartments to be locked to the raceway channel.

In accordance with the invention concept, cut-outs are provided within the outlet structures which, on the face of the outlets, allow installation of power and/or signal mounting plates and/or connectors and on the interior thereof are appropriate aligned with the power or signal compartment of the raceway channel.

Interior of the channel of the raceway assembly and system are projections which allow the insertion of wire guide members to facilitate loading of the compartments with appropriate conductors, power and signal. Also provided on the base on one side of the raceway channel is an interior projecting surface which allows the cover and outlets to be held in an open and preassembled condition allowing interior inspection of the raceway channel following connections between outlet connectors and cable but prior to "buttoning up" of the covers and outlets relative to the raceway channel.

The outlets are provided with snap-in end elements which cannot be readily removed without the use of a tool inserted between the outlet surfaces and the elements at a particular point to make removal difficult. The geometry of the cover and outlets in conjunction with the aforementioned end pieces forces a disassembly in a certain desired approach to preclude accidental removal or even intentional removal by those uninstructed or unauthorized, such as small children and the like.

A novel grounding connector is provided which includes teeth driven to bite into the raceway channel surface through any surface treatment or paint or other covering thereon to effectively extend ground between the several pieces of a raceway assembly making up a given installed system.

Finally, embodiments are described to allow placement of the raceway of the invention in or beneath walls, ceilings and floors with simple or dual channel construction.

BRIEF DESCRIPTION OF THE DRAWINGS

FIG. 1 is a perspective showing the surface applied raceway assembly and system as installed in walls, panel, floor, and ceiling of a building structure.

FIG. 2 is a view of the raceway channel of the invention taken in cross-section.

FIG. 3 is a view of the end of the channel shown in FIG. 2 enlarged to show the latching lip thereof in detail.

FIG. 4 is a cross-sectional view of the cover of the raceway assembly.

FIG. 5 is an enlarged view of the latching projection extending from said cover as shown in FIG. 4.

FIG. 6 is a cross-sectional view taken from the end of the outlet structure of the raceway assembly and system of the invention.

FIG. 7a is a partial and sectional view of the lip structure shown in FIG. 3 in mating with the projection structure shown in FIG. 5 at an initial point of engagement.

FIG. 7b is a partial and sectional view of the elements of 7a, but in a fully mated position.

FIG. 7c is a view of the elements shown in FIGS. 7a and 7b in the process of being unmated through the application of force applied by a tool such as the end of a screwdriver, shown in schematic or perspective.

FIGS. 8a and 8b are views of a wire management insert shown in elevation and section, respectively.

FIGS. 9a and 9b are elevational end and sectional views of end cap elements utilized with the outlets of the invention assembly.

FIGS. 10a and 10b are elevational end and sectional views of a centerpiece utilized with the installation of two or more outlets of the assembly of the invention.

FIG. 12 is an elevational and plan view showing the elements of FIG. 11 as assembled upon raceway channel and cover elements, including details in partial section and phantom.

FIGS. 13a-13c are schematic representations, respectively, of channel, cover and outlet geometries separated and in conjunction with a FIG. 13d which shows such elements in plan and in partial phantom as assembled to form a raceway assembly.

FIGS. 14a-14h are schematic, elevational representations outlining the steps of assembly from bare raceway channel through complete assembly of raceway components, cables, and electrical devices.

FIG. 15 is a front view of the raceway channel of the invention as it would appear relative to FIGS. 14c and 14d prior to installation of the assembly cover and other components.

FIG. 16 is a perspective in partial section of the raceway assembly installed in a wall with the various components applied.

FIGS. 17a and 17b are plan and sectional side views of a grounding clip of the invention assembly as shown at the end of FIG. 16 installed therein.

FIG. 19 is a sectional elevational view of a dual raceway embodiment of the invention for use with a modular wall panel.

FIG. 20 is a plan view of the embodiment shown in FIG. 19.

DETAILED DESCRIPTION OF THE INVENTION

Figure 11:
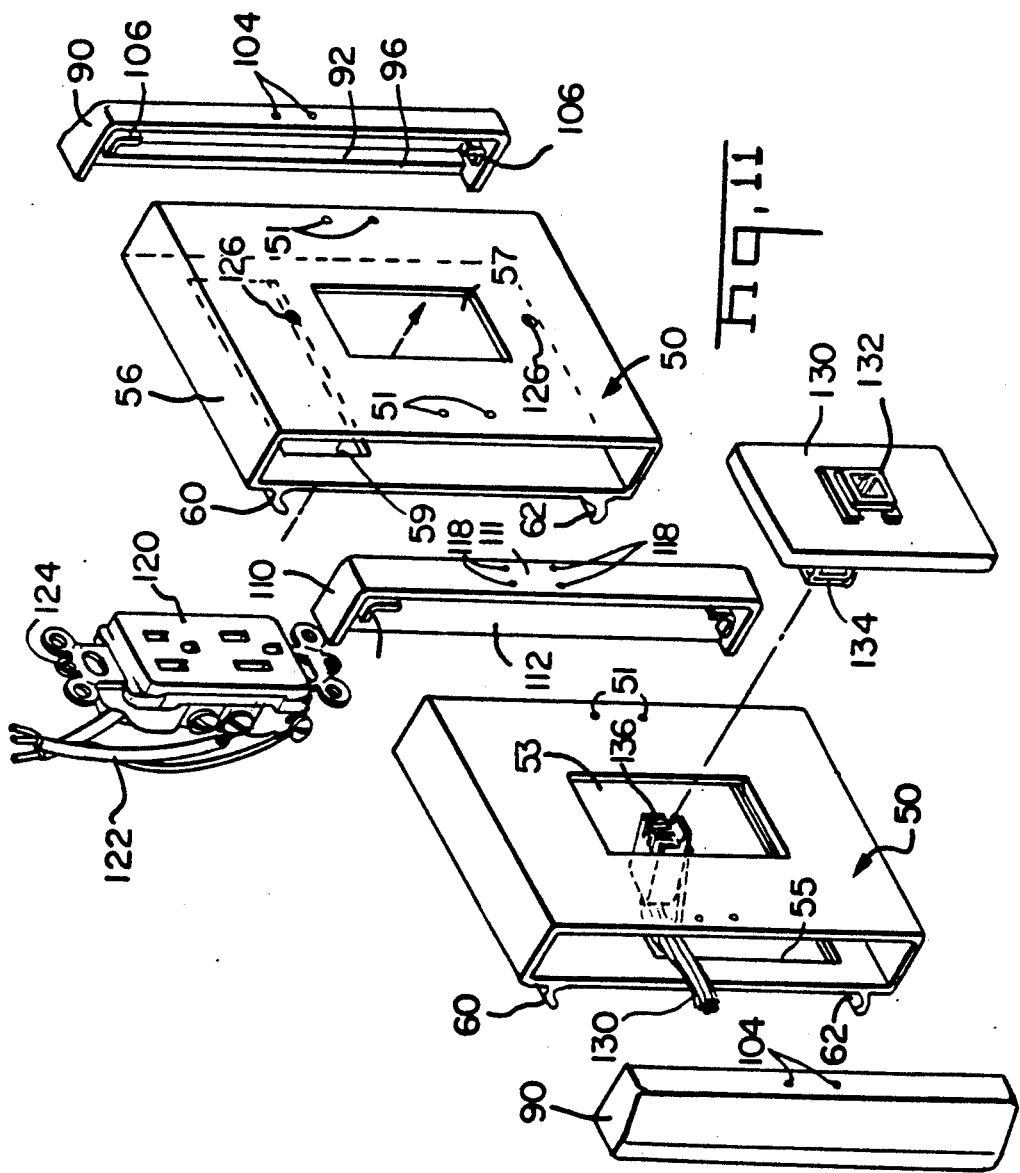
FIG. 11 is an exploded and sectional view of an outlet in conjunction with the end and center cap elements shown in FIGS. 6, 9a-9b, and 10a-10b, in conjunction with power and signal outlets and portions of the wiring therefore.

Referring now to FIG. 1, the walls, floor, and ceiling of a building structure are shown relative to raceway assemblies intended to provide power and signal distribution for various work stations. These raceway assemblies are also suitable for distribution of other cables, such as fiber optic cables. The walls are denominated E for "Exterior Wall," I for "Interior Wall," and C for "Cellular Panel," for interior movable walls, and M for "Modular Panels" which comprise semi-permanent partitions used in open office floor plans. The floor area is denominated F, and the ceiling area is denominated C. The various walls and ceiling construction, including the panel C and modular panel M, may be thought to be of conventional construction to include vertical structural units forming the function of studs which may be of the usual 2"×4" wooden type or of sheet metal configuration now widely used in commercial construction. Alternatively, with respect to the exterior walls, the construction may vary from brick to masonry to concrete block or the like. In accordance with the invention, the interior portions of the exterior wall, as well as solid and fixed interior walls, are covered with a facade, typically gypsum or drywall, denominated DW, although a variety of composite and fire-protected, insulating, and decorative coverings are known and used depending upon local code and climate. Such coverings range between ⅜" to ¾" in thickness with ⅝" in thickness being the standard in typical commercial and industrial applications, including offices. The sheets of drywall which are typically 4'×8", and in instances 4'×12' in width and height for ceiling application, are typically sealed and finished as by painting or covered with wallpaper or other facades following installation.

Ceiling construction varies from the use of drywall to lightweight ceiling panels hung into steel frames to provide a space above the ceiling for wiring and heating and air conditioning ducts. With respect to floors, the present invention contemplates the use of an appropriate underlayment such as particle or fiberboard suitably sealed in the form of 4'×8' sheets on the order of ⅜" in thickness which can be laid upon slab floors and spaced apart or cut to provide channels for the raceway assembly of the invention in the manner shown in FIG. 1. Cellular panels, such as C and modular panels M, are provided in many forms, including those which extend from floor to ceiling as shown in FIG. 1. Shorter modular panels M are utilized to define otherwise open office spaces.

In accordance with the present invention as shown by the letters W which stand for "Work Zone," electrical power, telephone cables and outlets, data cables and outlets can be provided to each Work Zone W to permit use of electrically driven electronic components such as computers, work stations, copiers, "fax" machines, local lighting, electric appliances, and the various paraphernalia of the office.

As is indicated in FIG. 1, the invention assembly and system has broad utility with the various wall, ceiling, and floor surfaces of an office, both with respect to initial installation and, as will be detailed hereinafter, subsequent alteration wherein outlet positions are changed and/or cable conductors added or removed in accordance with particular user needs. The invention assembly and system contemplates the running of various cables around the periphery of a building in the outside of the exterior wall as shown by raceway 2 on exterior wall to E. The raceway 2 is shown diagramatically in FIG. 1. Details of the raceway components are shown in other Figures. The assembly 2 is comprised of a channel 3 fitted with a cover 40, the channel 3 being recessed within the outer surface of a given wall and the cover 40 being essentially flush with such outer surface. A series of power cables 122 and data cables 138 are laid within the raceway assembly formed of 3 and 40. See FIG. 16. One end of each of the cables interconnected to an appropriate service entrance; power, telephone, or data; through apertures (not shown) made in the raceway channel 3 at appropriate locations relative to the service entrances. Extensions of such conductors may be alternatively brought through the wall and into the interior wall raceway assemblies 2. There at suitable locations, outlets may be installed in the manner indicated with respect to a power outlet such as 120 or telephone outlets such as 130 or various data outlets not shown in FIG. 1 but understood to be applied to the raceway assemblies where appropriate.

In a similar fashion, outlets 120-130 can be provided at different positions on a wall such as with respect to the floor-mounted raceway assembly 2 shown to the right of FIG. 1, or at desk height toward the middle of the interior walls I, or toward the middle or floor height of the panel C as shown in FIG. 1. A raceway may also be provided on the top of modular panel M. Power and signal conductors may also be carried in a raceway assembly 2 which is ceiling mounted as in C as indicated in FIG. 1 and the raceway may be used vertically as indicated in the wall I to carry power between the various raceway installations in wall, floor, and ceiling.

One advantage implicit in the invention raceway assembly is the ability to provide a protected and essentially sealed conduit positionable in a variety of ways, wall, panel, floor and ceiling to suit a given user. An immediate advantage of placement of the assembly at desk height is that the various power cable, along with computer or word processor and telephone cables, may be better organized so that there are essentially no cables laying upon the floor to be tripped over or to interfere with maintenance and cleaning operations, cables being run directly through short links from the various outlets directly to the equipment upon a desk.

As will become apparent from the description of the raceway assembly of the invention in conjunction with the techniques employed to lay power and signal cable as well as install cable guides and components, including outlet boxes, the invention lends itself to an easy and efficient installation as well as changeover and movement of outlets, rapidly, safely and efficiently.

Referring now to FIG. 2, channel 3 of the raceway assembly of the invention is shown in section to be comprised of an extruded shape with upstanding walls 4 and 24 joined by a floor or base 5. The wall portions 4 and 24 each include a lip shown as 6 and 26 extending inwardly of the channel to define a surface with respect to 6 shown as 8 or 28 with respect to lip 26. The surfaces 6 and 28 are parallel to the base 5 of the channel. Near the base 5 extending parallel thereto is a projection shown as 10 in FIG. 2 and in greater detail with respect to FIG. 3. Spaced from channel side 4 is a further projection or wall surfaces defined by 12 carrying proximate the root thereof, projections 14 and 16 as shown in FIG. 2, and a wall portion or barrier 18 extending from 12 parallel to the base 5. On the interior surface of the base 5 are two V-grooves 20 and 22 which extend along the length of the channel and serve to facilitate the positioning of and subsequent use of self-tapping screws, nails, or other fasteners which operate to fasten the channel to wall, ceiling, or floor structures.

At the end opposite upstanding portion 4 is a wall 24 which carries at its end the lip 26 heretofore mentioned and also the surface 28. Extending from wall 24 is a portion 30 which is generally parallel to the base 5 and turns upwardly to define a portion 32 and an interior surface shown as 34 which is continued on in a portion 36 which extends parallel to base 5 and perpendicular to upstanding portions 4 and 24.

The several projections 10, 14, 16, and portion 30 are spaced from the interior surface of 5 to define a series of slots shown as 31, 33, 35, and 37 in FIG. 2.

In a preferred embodiment, the channel member 3 was formed of extruded aluminum on the order of 0.060 inches in thickness, with slight variations to accommodate extruding flow patterns and the aforementioned grooves 20 and 22. The rounded portions, such as lips 6 and 26, and the remaining rounded portions of projections were essentially 0.030 inches in radius and the extrusion was given a finish adequate to accept various chromates, lacquers, paints or other finishes. In a preferred embodiment, the overall width dimension of the element 3 was roughly 5.5 inches as measured from the outsides of upstanding walls 4 and 24 and in depth, or the height of walls such as 4, on the order of 0.0625 inches.

Referring now to FIGS. 4 and 5, the cover 40 for the raceway assembly 2 is shown to define an essentially flat planar plate, the exterior outer surface 41 being in fact flat and the interior surface 43 being also flat but including a number of bumps such as 42 and projections 44 and 45. The bumps are optional and intended to cause the cover in relation to the channel with which it mates to at all times be in a state of compression to preclude vibration or "hum" as between the two elements in the face of the usual vibration and wall resonances in buildings caused by equipment, air conditioning, and the like.

On the inner surface of cover 40 the projections or continuous ribs 44 and 45 include details shown relative to projection 44 in FIG. 5, enlarged, and understood to be identical in a reverse sense with respect to projection 45. As can be seen in FIG. 5, there is a concave and radiused surface 46 which joins a flat surface 48 sloped inwardly of the ends of cover 40 and defining a guide surface with respect to the engagement of the lips 6 and 26 in the channel. Cover 40 is in a preferred embodiment extruded of aluminum in an overall thickness of 0.060 inches, except for the bumps 42 and other slight dimensional changes intended to assist in flow during extrusion. The projections 44 and 45 are generally of a similar thickness with the surface 46 being rounded to fit closely with the rounded and radiused surface of the lips defined as 6 and 26 in FIGS. 2 and 3.

The exterior of cover 40 may be anodized or painted or otherwise made to have selective finishes on the exterior surface to which paint or veneer or plastic paper or the like can be applied for aesthetic purposes. In working model, the overall dimension of cover 40 at its maximum was on the order of 6 inches with the projections 44 and 45 displaced on the order of 0.365 inches from the edge ends of the cover.

Referring now to FIG. 6, an extrusion for forming an outlet box 50 is shown in cross-section to be comprised of a front face 52 and spaced therefrom and essentially identical in terms of cross-section and dimension, a rear face portion 54, portions 52 and 54 being joined at the ends by perpendicular wall portions 56 and 58. Extending from the rear portion 54 are projections 60 and 62, essentially identical to the projections 44 and 45 previously described. The outlet 50 in an actual embodiment was extruded of aluminum to a thickness of roughly 0.060 inches and a generally constant cross-section, except for slight relief to assist in flow during extrusion. The outlet was approximately 6.0 inches in width and 1 inch in depth, referring to the outside spacing between the outer surfaces of 52 and 54. Apertures are provided in the front and rear of the extrusion to form the outlet box 50.

FIGS. 7a-7c show the engagement, mating, and disengagement of the lip and projections of the invention illustratively relative to a cover 40 and a lip 6 on the upstanding portion 4 of a channel 3; it being understood that a similar function would be achieved by the similar surfaces on the projections 60 and 62 with respect to the outlet 50.

In FIG. 7a there is shown the various details of a portion of the cover 40 in the process of being driven axially toward the upstanding wall 4 carrying lip 6. As can be seen, the inwardly and sloping surface 48 engages the outer portion of 6. Pressure applied on 40 causes 4 and upstanding portion 24 opposite thereto in the channel to spring outwardly sufficient to allow the lip 6 to pass over the surface of the projection and seat itself within the interior surface 46 in the manner shown in FIG. 7b. In accordance with the invention, the dimension of spacing between the lip 6 and lip 26 in the opposite upstanding portions 4 and 24 of the channel is made to be on the order of 20 or 30 thousands of an inch less than the dimension between the inner surfaces of 46 and the similar surface of projection 45 wherein to keep the cover 40 tightly clamped when seated within channel 3. To be noted in FIG. 7b at point S or the seam between cover 40 and channel 3, the surface 8 of the lip adjacent 6 and the surface 43 of cover 40 are tightly held together; there essentially being no room for the insertion of any usual means of prying parts apart, such as a screwdriver, blade tip, coin, nail, or the like. In fact, given the dimensional geometries of cover and channel, it is not practically feasible to withdraw the cover 40 from the channel 3 by pulling upon the edges of the cover by hand.

In FIG. 7c, the elements are shown in the process of being pried apart, cover 40 being removed from channel 3 by the use of a tool shown as T wedged between the end of projection 44 and the projection 10 extending from upstanding wall 4. This is a desired feature intended to force the removal of a cover only through end access and essentially within the volume of the channel or inside out. Practically speaking, this means that an outlet cove: must be first removed to give access to the interior of a channel prior to removal of a cover.

It has been discovered that the geometries shown allow the removal of a cover after the first displacement of an inch or so of the end of a cover by prying the cover upwardly into the position shown in FIG. 7c. Thereafter, by pulling on the cover proximate to the pried up part, the cover can be removed relatively easily pulling first one side and then the other.

It has been further discovered that the force of removal of the cover from a channel or the force of insertion of a cover with respect to a channel is altered appreciably by causing a disengagement or an engagement of one side or one projection of a cover at a time. The other side being seated, lip and projection at the time of disengagement or engagement. The angle of engagement of the beveled portion 48 of projection 44 is changed with respect to the rounded surface of lip 6 by virtue of the lifting of the cover for disengagement as shown in FIG. 7c or the angular displacement of the cover as shown in FIG. 7a.

Referring now to FIGS. 8a and 8b, a wire-retaining cable guide is shown as element 70 which may be molded by standard molding procedures or preferably extruded and cut to length. As can be seen in FIGS. 8a and 8b, the guide includes a flat guide portion 72 joined at an angle to an upstanding portion 74 to a base portion 76 and a lip portion 78. A hinged portion 80 interconnects the guide portion 72 and upstanding portion 74. At the end there is an offset and further lip portion 82. The guide can be made of polypropylene or polyvinylchloride in two essential geometries; one to fit in the power conductor compartment and one to fit in the signal conductor compartment in a manner to be hereinafter described with respect to FIGS. 14b-14e.

With respect to the power and signal conductor guides, the thicknesses employed were on the order of between 0.05 and 0.06 inches with the hinge point having a 0.025 inch radius. For the power conductor guide, the portion 72 was on the order of 1.2 inches and for the signal conductor guide, the portion 72 was on the order of 2.2 inches. The portions 76 and 78 for both guides are such as to fit within the interior slots of the raceway channel in the manner shown in FIGS. 14c-14e and in FIG. 15. These same figures also show the engagement of portion 82 with respect to surfaces interior of the channel 3.

FIGS. 9a and 9b show the constructional detail of end caps utilized with the outlets of the assembly of the invention. These caps are shown also in FIG. 11 preparatory to installation and in FIGS. 12 and 13d following installation. The cap shown as 90 in FIG. 9a includes a base portion 92 spaced from a further base portion 94 which has a downwardly turned lip 96. Portion 92, in conjunction with base portion 94, form a slot 98 which extends across the cap. These portions are joined by sloping side wall 100 as shown in FIG. 9b which joins top portion 102 carrying in the center thereof, as viewed in FIG. 9a, a pair of projections 104 which are beveled as shown in FIG. 9b. The use and function of the end caps will be described hereinafter with respect to the assembly. Typically, these caps are molded of an engineering plastic such as Noryl, a material available from the General Electric Company, and for purposes of understanding, are given a general wall thickness of on the order of 0.060 inches with an overall length of just in excess of 6 inches and an overall height of just in excess of 1 inch.

FIGS. 10a and 10b show a center cap element 110 which has an outer, upper surface 111, a rearwardly projecting center portion 112 and end portions 114. Interiorly of the cap and projecting from either side are projections 116 spaced from the interiors of 111 and 114 and utilized in a manner to be hereinafter described with respect to the assembly. The center caps may optionally include projections shown as 118 beveled as indicated in FIG. 10b. These caps would be preferably molded of the same material and generally of the same dimensions as that referred to above with respect to the end caps.

FIG. 11 shows the end caps and a center cap preparatory to use in an assembly with outlet 50. These outlets include a series of apertures in the front and rear faces thereof, both including small round holes 51 punched therein on centers adapted to cooperate with the inner projections 104 of the end caps and the projections 118 of the center caps to latch the caps to the outlet boxes against accidental displacement. The left-handed outlet box 50 includes an aperture in the front face thereof shown as 53 and an aperture in the rear face thereof shown as 55, such rear apertures exposing the interior of the outlet box to the lower compartment of channel 3. The outlet box 50 shown to the right includes an aperture 57 in the front face thereof, and a further aperture 59 in the rear face thereof, aligned with the upper compartment of channel 3. The selective positioning of knock-outs on the boxes adapts them to particular uses, power and/or signal knock-outs. A power outlet in the form of a duplex receptacle 120 is shown in FIG. 11 preparatory to being inserted inside of box 50 through outlet aperture 57. The receptacle 120 is terminated to appropriate wires 122 which are made to extend through the aperture 59 and into the upper compartment of a channel 3. A metallic mounting and grounding strap in the form of the element shown as 124 is included which is, in this embodiment, joined electrically to the outlet 50 by appropriate metal screws fitted through apertures 126 in the face of the outlet box. A signal outlet 130 is shown in FIG. 11 to include a connector having an outer portion 132 and an inner portion 134. The outer portion 132 here represented is a standard telephone jack, and the portion 134 is a telephone receptacle integral therewith adapted to receive a telephone plug 136 terminated to telephone conductors 138. The outlet 130 may be mounted to the outlet 50 through the aperture 153 having first the jack 136 plugged into 134. The element 130 may include suitable plastic or metal fastenings integral therewith or added thereto to hold 130 within outlet 50. The cable 138 is appropriately fitted within the lower compartment of channel 3.

FIG. 12 shows the foregoing mentioned components assembled upon a channel 3 with the various elements fitted together and a cover plate 40 applied to the channel with the outlets and their end caps snugly fitted thereto. The various power and signal conductors can be seen extended into their appropriate compartments.

Referring now to FIGS. 13a-13d, the several extrusion components of the raceway assembly and system of the invention are shown schematically in the process of assembly.

With respect to the channel 3, it is first positioned against the appropriate flat surface wall, panel, ceiling or floor as shown in FIG. 14a. Grooves 20 and 22 extend along the length of the channel extrusion thus providing a portion thereof always aligned at some point with studs or solid mounting material. Using self-tapping screws, nails, or pre-drilling and using standard screws or anchors appropriate to the material upon which channel 3 is being mounted, such fasteners are appropriately used guided by the positioning of grooves 20 and 22 to locations less likely to interfere or cause shorting with the electrical devices employed with the system. Self-tapping screws 140 are shown applied in FIG. 14a. Specially adapted fasteners could also be employed. The mounting of channel 3 directly upon the stud or surface facilitates a flush mounting of the raceway assembly 2 in that drywall approximating the thickness of the assembly 2 can then be applied abutting the edges of channel 3 in the manner shown in FIG. 14a, this step of application of channel 3 may be viewed as similar to the first step of rough preparation or mounting of the conduit in standard wiring procedures.

Next in accordance with the concept of the invention, wire retainer guide elements 70 and 70' are applied to the channel 3 with the end projections 78 and 78' fitted within the slots defined interiorly of the channels and identified as 31 and 35. At this point in time, the wire retainer guides are seated within the channels held by the geometries of the portions 74 and 76 and extending outwardly through the hinges 80 and 80' to allow power conductors 122 and signal conductors 138 to be inserted in the appropriate compartments. With respect to such application, it is typical practice to lay out the various conductors along the channel length, cut them to appropriate lengths, and then with respect to wall or panel mounted channels, drop them into the appropriate compartments utilizing the guides 70 and 70' to assist in such placement. With respect to floor mounted channels, the cables may be pushed in or slid in to the appropriate compartments, and with respect to ceiling mounted applications, also pushed into the appropriate compartments in the manner shown in FIG. 14c.

Thereafter, the guides may be depressed so that the ends 82 and 82' are fitted within the channels, snapped into position in the grooves 33 and 37 provided interiorly of the channel to hold the various conductors in place. Note the depiction in FIG. 15 wherein to the left, wire guides 70 and 70' are shown in the condition wherein the ends are open and wherein the ends are snapped in place with respect to the right of the figure.

In floor and ceiling applications, the various conductors may be inserted, power or signal, altogether with the wires guides progressively as the cables are placed within the channel, snapped into place to hold such wires in position.

Next, in accordance with the assembly of the invention, cover plates are attached to the channels by inserting the lower projection, projection 45, into the groove 25 formed by portions 24, 30, and 32 at the rear of channel 3. This allows the cover 40 to hang on the channel, the surface 32 cooperating with the end of projection 45 to hold the cover hinged open in place wherein an inspection of the cables can be made prior to a final closure.

Figure 18:
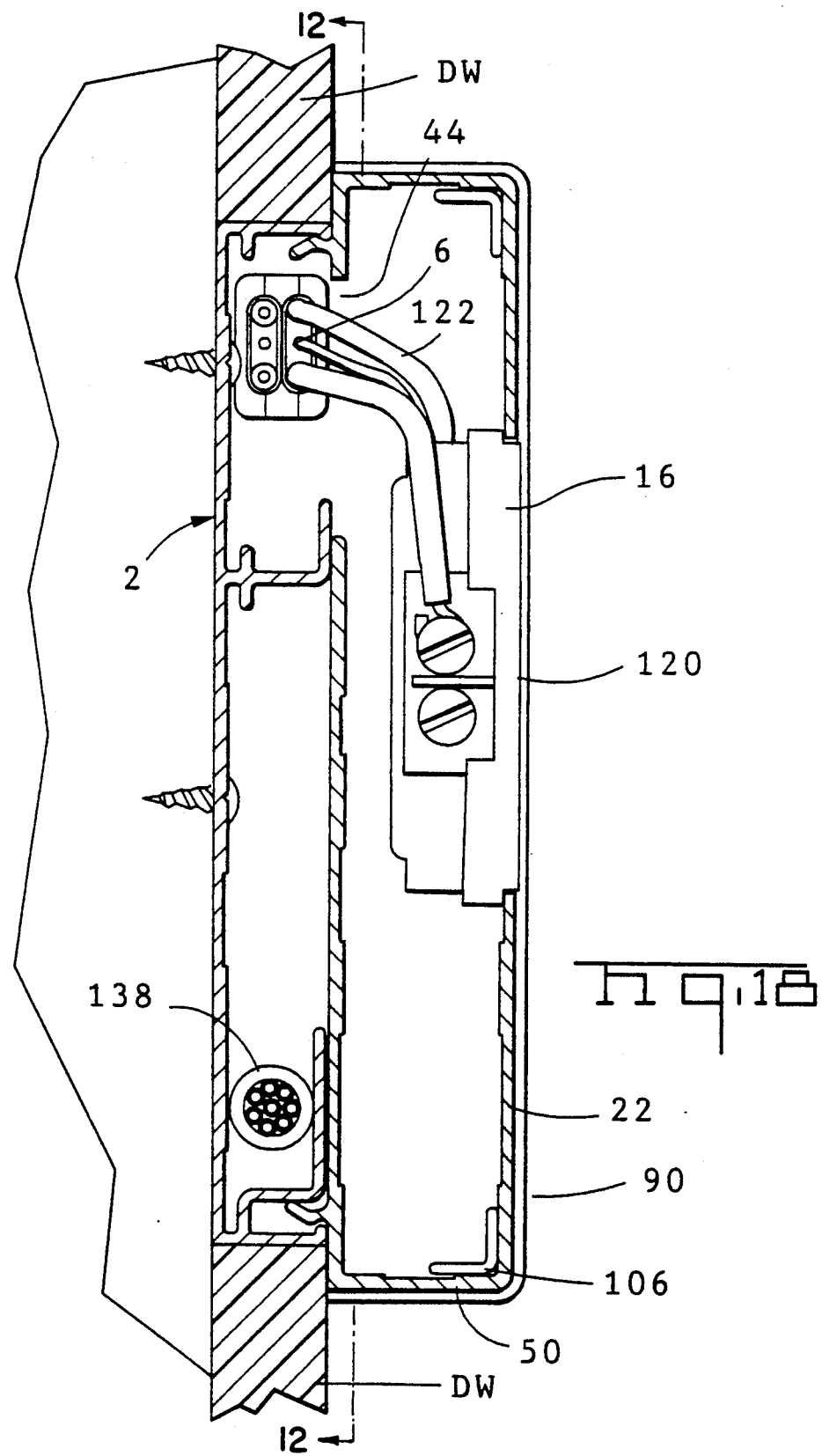
FIG. 18 is a side sectional view of the assembly shown in FIG. 16.

Next in accordance with the invention concept, the various outlets, power and signal, are applied to the various outlets 50 with the conductors of the various compartments either preterminated to connectors and plugged into such electrical devices, or in the case of the power device shown in FIGS. 11 and 12, terminated after conductor portions of 122 are extended through the aperture 59 and terminated in the manner shown in FIG. 18. The outlets 50 containing electrical signal devices can be mounted in the manner shown in FIG. 14f to hold such outlets in place with the system relatively open for inspection and indeed in certain instances, to allow final termination to take place as between power conductors and the conductors of the outlet.

As can be appreciated, the entire system can be left open for inspection and then after such step, closed up by pressing the covers and the outlets which snap in place within the channel. It is to be noted from FIGS. 14d, 14e, and 14g that the various conductors are organized and contained by the wire guide members snapped in place and that no cross wires as between power and signal compartments can occur due to the physical barriers provided essentially by the projections 12 and 18. In other words, signal is isolated from power. FIGS. 14e–14h show, in side view schematically, the invention raceway assembly. FIG. 13d shows this assembly from the front, partially open, partially closed.

FIG. 16 shows the invention assembly in perspective as mounted within a wall, the drywall DW abutting the outside side portions of the channel 3 and the cover plate 40 extending over the surface of DW. Stud S is shown in relation to the exterior wall of board, EB. At the left end of the view shown in FIG. 16 is a grounding element 150 positioned so that one-half engages the interior base of channel 3 and the other end thereof engages the interior channel of an adjoining section of channel shown in phantom. The grounding element 150 is shown in more detail in FIGS. 17a and 17b to include a pair of holes 152 spaced apart intended to receive screws shown as 153 made to extend through the base of the channel 3 in the manner shown in FIG. 17b and compress the element 150 to drive pointed sharp edges 154 and 156 into the surface interior of the channel, scraping and biting into the metal thereof to provide an electrical connection between adjacent sections of channels. The compression of the element 150 is made to include a sufficient spring force to hold the ends of the teeth 154 and 156 in a gas-tight sealed relationship with respect to the material of the channel. The elements 150 may be made of steel, suitably plated with tin or zinc or other materials, to effect such connection.

As can be discerned from FIGS. 16 and 18, the raceway 2, including cover 40, is essentially flush mounted by being recessed within DW, the outlet boxes 50 essentially projecting from the surface of DW to accommodate the depth of the electrical devices employed.

With respect to FIG. 18 in application to ceiling or floor installation, DW may be taken to represent ceiling panel, drywall or lightweight panels. With respect to floor installation, DW may be taken to represent underlayment of an appropriate thickness such as ⅜ inches to leave the assembly essentially flush with the upper surface, it being understood that overlayment such as carpet will be installed over the assembly, except at outlet positions.

FIGS. 19 and 20 show another embodiment of the invention raceway 2' including a pair of channels 3' and 3" positioned oppositely in a common extrusion to be used beneath a cellular or modular wall panel. The channel 2' is shown in such use in FIG. 1. Additionally, included between channels 3' and 3" is a center plenum 160 which serves as a spacer to provide the proper thickness for a given cellular panel thickness. Within the base walls of 3' and 3" are slots 162 and 164 seen in FIG. 20 to extend lengthwise of the channels to accommodate crosswiring from 3' to 3" or vice versa, allowing, where called for by wiring needs, selective crossovers of either power or signal conductors from one side of the panel to the other.

Raceway 2' further includes means to lock the raceway to a panel such as bracket 166 which can be fitted with bolts at the end of the cellular panel C as shown in FIG. 20. The raceway 2' can be leveled by means of feet 168 fitted periodically along the length of the assembly and adjusted appropriately to accommodate a given panel C.

It is to be understood that alternative constructions using single channel versions of the invention raceway are contemplated, relying on additional constructional detail to fit the separate raceways to filler boards and the like.

With respect to all embodiments, alterations may be made simply by removing covers 40 and 40', changing conductors, repositioning outlets, or adding outlets and then snapping such parts back together. Where necessary, covers 40 and 40' may be shortened or additional cover material of appropriate length provided; all without drilling and tapping and the addition of screws and bolts.

It is contemplated that the raceway system is to be first installed, followed by installation of drywall, ceiling panels or underlayment although depending upon particular needs, the system is adaptable to installation at a later time, given proper spacing of drywall, panels or underlayment.

It is fully contemplated that in certain applications the invention assembly may be surface mounted to project beyond the surface of the wall or panel application, although not with respect to the surface of the ceiling or floor. In such instances, an appropriate decorative molding, wood, plastic, or metal, may be employed to be fitted along the outer surfaces of the projections 4 and 24 of the channel and the interior surface of the cover which extends beyond the projections 60 and 62. It is also contemplated that the depth and width and other geometries of the channel may be altered to provide a greater or lesser width and depth appropriate to the cables and electrical devices utilized with the system. It is further contemplated that the interior portions of the channel, including specifically the projections 12-18 may be replaced by an alternative structure screwed, bolted, or otherwise locked in place within the channel as by example being inserted into the spaces 31 and 37 to provide more than two compartments therewithin.

Having now disclosed the raceway assembly and system of the invention, we claim:

1. An enclosure comprising a channel of a given axial length having a transverse base with upstanding sides extending along said given length and terminated by lips directly inwardly parallel to said base, each lip including a rounded surface of a given radius, a further mating element adapted to be snap-fitted to said channel to form said enclosure, said mating element including an interior surface at each side thereof and there adjacent a pair of stiff projections, one for each side extending along the length thereof with each projection including a concave surface of a radius adapted to receive in mating engagement the said rounded surface of each lip, said further element being loaded in compression and said upstanding sides of said mating element being loaded in bending when the further element is mated with the upstanding sides of the transverse base, the length of said upstanding sides being substantially less than the height of said mating element so that the upstanding sides remain relatively inflexible, so that said further element is tightly secured to the base said further mating element being snap fittable between said upstanding sides by hand applied pressure and said further element being removable only upon the application of a force applied by a tool having a lever arm, wherein there is provided means allowing said further element to be positioned loosely attached to said channel at one side thereof permitting inspection of the interior of said channel prior to said further element being snapped into closing position on said enclosure.

2. The enclosure of claim 1 wherein the said rounded surface of each said lip and each said concave surface are dimensioned at the sides of said channel and said further element respectively to provide seams therebetween less than 0.003 inch wide.

3. The enclosure of claim 1 wherein the said rounded surfaces of said lips are spaced transversely apart a distance less than the transverse spacing of said concave surfaces of said further element whereby to provide an interference fit precluding separation of said further element from said channel by unaided hand-applied force.

4. The enclosure of claim 1 wherein the said further element comprises a cover having an exterior flat surface.

5. The enclosure of claim 1 wherein the said further element comprises an outlet box.

6. The enclosure of claim 1 wherein the said channel and further element have constant cross-sectional configurations along the lengths thereof such that the said element can be fitted axially to said channel at any position along the length thereof through engagement of said lips and said projection surfaces.

7. The enclosure of claim 1 wherein the said projections of said further element include further surfaces beveled inwardly with respect to the center axis of said further element at an angle to provide a camming action through engagement with a lip of said channel during closure of said further element with said channel.

8. The enclosure of claim 1 wherein each lip includes a flat narrow surface adjacent to said rounded surface, the flat surface and the inner surface of said further element fitting tightly together along the length thereof when mated to preclude the insertion of a tool edge or the like between said surfaces to pry said element from said channel.

9. A raceway enclosure assembly for accommodating conductors for termination to electrical outlets, said enclosure assembly including a channel having interiorly thereof projections defining slots extending along the length of said channel, a plurality of conductor guides having end portions adapted to fit within said slots and be held affixed to said channel prior to insertion of said conductors and further portions extending outwardly of said channel to guide the insertion of conductors therein, the said guide elements including flexible portions foldable into said channel following the insertion of conductors therein and having projections adapted to fit in further slots in said channel to hold said conductors in position therewithin.

10. The raceway assembly of claim 9 wherein said guide members are of a length forming a fractional segment of the length of said channel and are adapted to be placed periodically along the said channel.

11. The raceway enclosure assembly of claim 9 wherein there is provided a further set of projections interiorly of said channel forming a further set of slots adapted to receive a second conductor guide element including end projections adapted to fit within said further set of slots and hold said conductors within said channel.

12. The raceway enclosure assembly of claim 9 wherein there is further included a conductor dividing portion extending from the base of said channel whereby to provide at least two compartments for conductors fitted within said channel.

13. An enclosure for conductors, including a channel adapted to be attached to a fixed surface, said channel having a transverse base and side portions terminated in lip portions and there adjacent surfaces parallel to said base, a further element including stiff projections having concave surfaces that fit the said lip portions and further including beveled portions extending inwardly to engage said lip portions upon attachment of said further element to said channel whereby to cam the said side portions of said channel outwardly to permit seating of said lip portions within said concave surfaces to tightly hold such channel and further element together, said channel including further means defined by projections extending from within said channel adapted to engage the end of a said stiff projection and hold said further element loosely attached to said channel at an angle permitting inspection interiorly thereof.

14. A raceway assembly for accommodating power and data conductors in separate compartments, said assembly including a channel having at least one center projection adapted to define at least two compartments, a cover element including means at the edges of said cover element to lock such cover element to said channel and means interiorly thereof to engage such projection to enclose said two compartments, a first outlet housing means for accommodating a given electrical connector device including a rear wall apertured to be aligned with one of said compartments, and a second outlet housing means for accommodating a further electrical connector device and including a rear wall apertured to be aligned with another of said compartments whereby conductors in a given compartment can be connected to devices through such rear wall apertures in said outlet housing means.

15. The assembly of claim 14 wherein the rear walls of the first and second outlet housing means have means at the edges thereof to lock the respective outlet housing means to the channel.

16. The assembly of claim 15 wherein the means on the rear walls of the first and second outlet housing means to lock the respective outlet housing means to the channel are of the same shape as the means on said cover element to lock said cover element to said channel.

17. The assembly of claim 16 wherein the cover element comprises a flat member protruding beyond a front edge of the channel and the center projection by a distance substantially equal to the thickness of the cover element.

18. The assembly of claim 17 wherein the center projection protrudes from a base of the channel and includes a barrier wall extending parallel to the base, the height of the barrier wall being less than the height of the compartment above the center projection.

19. The assembly of claim 18 wherein barrier walls are located on an outer face of each compartment, the cover element being mounted in contact with the barrier walls.

20. The assembly of claim 19 wherein the rear walls of the first and second outlet housing means are mounted in contact with the barrier walls, the first and second outlet housing means protruding beyond the cover elements.

21. The assembly of claim 14 wherein the channel comprises a abase with top and bottom walls extending transversely from top and bottom edges of the base, each wall having an inwardly directed lip at the free end thereof, the means for locking the cover element to the channel comprising continuous ribs on an inner face of the cover element.

22. The assembly of claim 21 wherein each continuous rib has a concave radiused surface on an outwardly facing surface thereof at the juncture of the rib and the cover element, an inwardly sloping flat surface of each rib extending from the radiused surface, the concave radiused surfaces being configured to tightly engage the inwardly directed lips of the top and bottom walls, the flat surface of each rib defining a guide surface for initially engaging the corresponding inwardly directed lip.

23. The assembly of claim 22 wherein an interior wall portion is located adjacent the bottom wall, the center projection and the interior wall portion each having a barrier portion at the ends thereof, each barrier portion being parallel to the base and having a height, less than the height of a corresponding compartment, so that each compartment is partially open on a front face prior to attachment of the cover element to the channel.

24. The assembly of claim 23 wherein the inner wall initially projects transversely from the bottom wall, spaced from the base, and then extends parallel to and spaced from the bottom wall, the barrier portion of the inner wall extending perpendicular to the bottom wall in substantially the same plane as the inwardly directed lip on the bottom wall.

25. A surface accessible raceway for accommodating conductors, the raceway being suitable for mounting on a structural wall having a wall finish layer of predetermined thickness covering the structural wall, the raceway including a channel, a cover securable to the front of the channel and means for securing the channel to the structural wall:

the channel further comprising a base with upper and lower sides having a depth approximating the thickness of the wall finish layer so that the front of the channel is substantially flush with the surface of the wall finish layer, each of the sides having inwardly directed lips oriented parallel to the base, the channel also having a center partition extending parallel to the sides and dividing the channel into two compartments, each compartment being at least partially open on the front and having a height substantially greater than the depth of the compartment, with means being located at the front of each compartment for retaining conductors in the channel prior to securing the cover to the channel;

the cover further comprising a flat planar plate having opposed stiff projections protruding from an inner surface of the flat planar plate adjacent the edges thereof, the stiff projections engaging the inwardly directed lips on the interior of the sides to secure the cover to the channel so that the raceway protrudes beyond the wall finish layer to a distance no greater than the thickness of the flat planar member, wherein the means for retaining conductors in the channel prior to securing the cover to the channel comprises flexible conductor retainer guides insertable in each compartment, the lower end of each flexible conductor retainer guide being held in its associated compartment and the upper end of each flexible conductor retainer guide initially extending beyond the front of the associated compartment so that the conductors can be laid into associated compartments, the upper end of each flexible conductor retainer guide being insertable into the associated compartment after the conductors are laid in the proper compartment.

26. The surface accessible raceway of claim 25 wherein the means for retaining conductors in the channel prior to securing the cover to the channel comprises a barrier extending upwardly along a portion of each compartment to form a trough along the bottom of each channel so that conductors can be laid in the trough prior to securing the cover to the channel to close the raceway, the barriers comprising an integral part of the channel.

27. The surface accessible raceway of claim 26 wherein an interior wall portion in a lower said compartment, adjacent the lower side of the channel has a barrier extending upwardly on the front of the channel and the partition also has a barrier extending upwardly on the front of the channel, each barrier having a height less than the height of the associated compartment so that the front of each compartment remains open for the insertion of conductors, the partition, the interior wall portion and the barriers comprising integral parts of a one piece extruded channel.

28. The surface accessible raceway of claim 25 wherein each compartment has a trough defined by a barrier on the front of the channel parallel to the base, and at the bottom of the associated compartment, the flexible conductor retainer guides being insertable into the associated through with the upper end of each flexible retainer guide initially extending beyond the associated barrier so that conductors can be laid in the proper compartment.

29. The surface accessible raceway of claim 28 wherein the a plurality of flexible retainer guides are insertable at intervals in associated compartments, the flexible retainer guides and the barriers forming the means adjacent the front of the channel for retaining conductors in the channel prior to securing the cover to the channel.

30. The surface accessible raceway of claim 29 wherein an interior wall portion extends adjacent the lowermost side of the channel, the lowermost stiff projection on the cover being insertable between the interior wall portion and the lowermost side to hold the cover in a partially open configuration so that the conductors in the compartments can be inspected prior to closing the raceway.

31. The surface accessible raceway of claim 25 wherein the depth of the channel is substantially equal to five-eights of an inch so that the channel will be flush with a surface finish layer comprising standard drywall.

32. The surface accessible raceway of claim 31 wherein the stiff projections engage the lips on sides of the channel with sufficient force such that the cover cannot be pried from the channel by a force applied to the top or bottom of the cover without damaging the drywall.

33. An enclosure comprising a channel of a given axial length having a transverse base with upstanding sides extending along said given length and terminated by lips directly inwardly parallel to said base, each lip including a rounded surface of a given radius, a further mating element adapted to be snap-fitted to said channel to form said enclosure, said mating element including an interior surface at each side thereof and there adjacent a pair of stiff projections, one for each side extending along the length thereof with each projection including a concave surface of a radius adapted to receive in mating engagement the said rounded surface of each lip, said further element being loaded in compression and said upstanding sides of said mating element being loaded in bending when the further element is mated with the upstanding sides of the transverse base, the length of said upstanding sides being substantially less than the height of said mating element so that the upstanding sides remain relatively inflexible so that said further element is tightly secured to the base, said further mating element being snap fittable between said upstanding sides by hand applied pressure and said further element being removable only upon the application of a force applied by a tool having a lever arm, wherein said channel includes a further surface interiorly thereof projecting to engage a surface of the said projection of said further element to permit said further element to be loosely attached to said channel in a position at an angle to the plane of the base thereof whereby to permit inspection of the interior of said channel while said further element is loosely attached thereof.

* * * * *

UNITED STATES PATENT AND TRADEMARK OFFICE
CERTIFICATE OF CORRECTION

PATENT NO. : 5,024,614

DATED : June 18, 1991

INVENTOR(S) : Frank P. Dola, et al

It is certified that error appears in the above-identified patent and that said Letters Patent is hereby corrected as shown below:

In claim 21, column 15, line 56, delete "abase" and insert --base--.

In claim 25, column 16, line 46, delete "to" and insert --by--.

In claim 28, column 17, line 19, delete "through" and insert --trough--.

Signed and Sealed this

Twenty-second Day of December, 1992

Attest:

DOUGLAS B. COMER

*Attesting Officer*  *Acting Commissioner of Patents and Trademarks*